United States Patent
Yamanaka et al.

(10) Patent No.: US 7,472,769 B2
(45) Date of Patent: Jan. 6, 2009

(54) HYBRID VEHICLE CONTROL SYSTEM

(75) Inventors: Tsuyoshi Yamanaka, Yamato (JP);
Koichi Hayasaki, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 110 days.

(21) Appl. No.: 11/593,134

(22) Filed: Nov. 6, 2006

(65) Prior Publication Data

US 2007/0102205 A1    May 10, 2007

(30) Foreign Application Priority Data

Nov. 7, 2005    (JP)    ............... 2005-322198

(51) Int. Cl.
*B60K 1/00*    (2006.01)
(52) U.S. Cl. ............... 180/65.2; 180/65.6; 903/926
(58) Field of Classification Search ............... 180/65.2, 180/65.3, 65.5, 65.6; 477/181, 32, 6, 2; 74/335, 74/473.21; 903/926, 940, 946, 948
See application file for complete search history.

(56) References Cited

U.S. PATENT DOCUMENTS

| | | | |
|---|---|---|---|
| 5,400,678 A | | 3/1995 | Jain et al. |
| 5,720,690 A | * | 2/1998 | Hara et al. ............... 180/65.2 |
| 5,947,863 A | | 9/1999 | Grob et al. |
| 6,018,198 A | * | 1/2000 | Tsuzuki et al. ............... 180/65.2 |
| 6,338,391 B1 | * | 1/2002 | Severinsky et al. ......... 180/65.2 |
| 6,692,406 B2 | * | 2/2004 | Beaty ............... 477/32 |
| 6,852,062 B1 | * | 2/2005 | Ahner et al. ............... 180/65.2 |
| 7,062,986 B2 | * | 6/2006 | Metzger et al. ............... 74/335 |
| 7,131,933 B2 | * | 11/2006 | Tabata ............... 477/181 |
| 7,347,803 B2 | * | 3/2008 | Kobayashi et al. ............... 477/5 |
| 7,351,182 B2 | * | 4/2008 | Kobayashi ............... 477/5 |
| 2003/0153429 A1 | * | 8/2003 | Boll ............... 477/6 |
| 2004/0152558 A1 | | 8/2004 | Takami et al. |
| 2005/0054480 A1 | | 3/2005 | Ortmann et al. |
| 2005/0197233 A1 | | 9/2005 | Hoshiya et al. |

FOREIGN PATENT DOCUMENTS

GB    2366845 A    3/2002
JP    H11-082260    3/1999

* cited by examiner

*Primary Examiner*—Hau V Phan
(74) *Attorney, Agent, or Firm*—Global IP Counselors, LLP

(57) ABSTRACT

A hybrid vehicle control system is configured to improve fuel economy by optimizing a torque transfer capacity of a clutch transmitting drive power from both an engine and a motor/generator while the motor torque provides at least part of the drive force. In particular, the system selectively controls a pair of clutches to switch between an electric drive mode and a hybrid drive mode. The torque transfer capacity of the clutch transmitting drive power from both the engine and the motor/generator to a drive wheel includes a motor/generator torque component and an engine torque component. The motor/generator torque component is determined based on a motor/generator torque and a torque transfer capacity margin allowance for the motor/generator torque. The engine torque component is determined based on an engine torque and a torque transfer capacity margin allowance for the engine torque when the drive wheel is driven at least by the motor/generator.

16 Claims, 13 Drawing Sheets

HYBRID VEHICLE CONTROL SYSTEM

CROSS-REFERENCE TO RELATED APPLICATIONS

This application claims priority to Japanese Patent Application No. 2005-322198, filed on Nov. 7, 2005. The entire disclosure of Japanese Patent Application No. 2005-322198 is hereby incorporated herein by reference.

BACKGROUND OF THE INVENTION

1. Field of the Invention

The present invention relates to a braking control system for a hybrid vehicle having an electric drive (EV) mode in which a drive wheel is solely driven by a motor/generator and a hybrid drive (HEV) mode in which the drive wheel is driven by an engine and the motor/generator, or the engine only. More particularly, the present invention relates to a hybrid vehicle control system configured to control a torque transfer capacity of a clutch that directs the drive power from both the engine and the motor/generator to a drive wheel during travel wherein the drive power from the motor/generator is used for at least part of the vehicle drive force.

2. Background Information

Various configurations have been proposed for hybrid vehicle drive control systems to be used in hybrid vehicles. One such hybrid drive system is presented in Japanese Laid-Open Patent Publication No. 11-082260. The hybrid vehicle drive control system presented in Japanese Laid-Open Patent Publication No. 11-082260 has a motor/generator arranged between an engine and a transmission so as to be coupled to a shaft that directs the rotation of the engine to the transmission, a first clutch operatively connecting and disconnecting the engine to and from the motor/generator, and a second clutch operatively connecting and disconnecting the motor/generator to and from the output shaft of the transmission. The second clutch is provided to replace a conventional torque converter.

A hybrid vehicle equipped with a hybrid vehicle drive system like that just described can be put into an electric drive (EV) mode in which the vehicle travels solely by means of power from the motor/generator by disconnecting the first clutch and connecting the second clutch. Such a hybrid vehicle can also be put into a hybrid drive (HEV) mode in which the vehicle travels using power from both the engine and the motor/generator by connecting both the first clutch and the second clutch. Accordingly, the second clutch is a clutch that directs the drive power from both the engine and the motor/generator to the drive wheel.

In view of the above, it will be apparent to those skilled in the art from this disclosure that there exists a need for an improved hybrid vehicle control system. This invention addresses this need in the art as well as other needs, which will become apparent to those skilled in the art from this disclosure.

SUMMARY OF THE INVENTION

The torque transfer capacity of a clutch, such as the abovementioned second clutch in a transmission system of a hybrid vehicle wherein an engine serves as the main drive power source, is generally determined based on engine torque information and a safety factor similarly to when the engagement force of a frictional element, for example, brakes or a clutch, inside an automatic transmission is determined. The engine torque information regarding the engine (the main drive power source) is obtained from the engine throttle opening, the accelerator position opening, and the like, which affects an amount of torque inputted to the clutch. The safety factor is set for the purpose of preventing inadvertent clutch slippage.

The engine torque includes, for example, a static indefinite component and a pulsating component, and also has dynamic characteristics, all of which must be taken into consideration to ensure that the clutch does not slip when determining the torque transfer capacity of the clutch. Therefore, the abovementioned safety factor is required to be set to a relatively large value of, for example, 1.3.

Accordingly, in the case of the abovementioned hybrid vehicle equipped with the engine (the main drive power source) as well as a motor/generator (the drive power source), the torque transfer capacity of the second clutch disposed between the drive wheel and the motor/generator is controlled by using a relatively large safety factor for the engine.

However, by using this relatively large safety factor for the engine when determining the torque transfer capacity of the second clutch, the torque transfer capacity of the second clutch becomes excessively large during traveling in the EV mode, during traveling in the HEV mode, and during transition from the EV mode to the HEV mode, wherein the drive power from the motor/generator is used as at least part of the vehicle drive force. Consequently the problems discussed later arise.

More specifically, compared with the engine, the torque of the motor/generator has a small static indefinite component and a small pulsating component, and the motor/generator has quick control responsiveness. Thus, the motor/generator safety factor used when determining the torque transfer capacity of the second clutch for the motor/generator torque component does not produce slippage of the second clutch, even if the motor/generator safety factor is set to a value that is significantly lower than the engine safety factor.

Consequently, if the torque transfer capacity of the second clutch is always determined by using an engine safety factor that is large, then the torque transfer capacity of the second clutch will become excessive when switching between the EV mode and the HEV mode that use the drive power from the motor/generator for at least part of the vehicle drive force. Accordingly, the energy generated by overcapacity of the second clutch is wasted thereby causing degradation in fuel economy as well as a reduction of drive power performance.

Accordingly, one object of the present invention is to provide a hybrid vehicle control system configured to control the torque transfer capacities of the clutches in which the smallest possible motor/generator safety factor is used to determine the torque transfer capacity of the second clutch for the motor/generator torque component when using the drive power from the motor/generator for at least part of the vehicle drive force. Thus, an excess in the torque transfer capacity of the second clutch can be prevented and problems related to the abovementioned degradation of fuel economy and reduction of drive power performance can be avoided.

In order to achieve the above mentioned object, a hybrid vehicle control system in accordance with the present invention is basically provided with an engine, a motor/generator, a first clutch, a second clutch and a controller. The first clutch is configured and arranged to change a first torque transfer capacity between the engine and the motor/generator. The second clutch is configured and arranged to change a second torque transfer capacity between the motor/generator and at least one drive wheel. The controller is configured to selectively control the first and second clutches to switch between an electric drive mode in which the first clutch is released and the second clutch is engaged, and a hybrid drive mode in which both the first and second clutches are engaged. The controller is configured to determine the second torque transfer capacity including a motor/generator torque component and an engine torque component with the motor/generator torque component being determined based on a motor/generator torque and a torque transfer capacity margin allowance for the motor/generator torque and the engine torque component being determined based on an engine torque and a torque transfer capacity margin allowance for the engine torque when the drive wheel is driven at least by the motor/generator.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
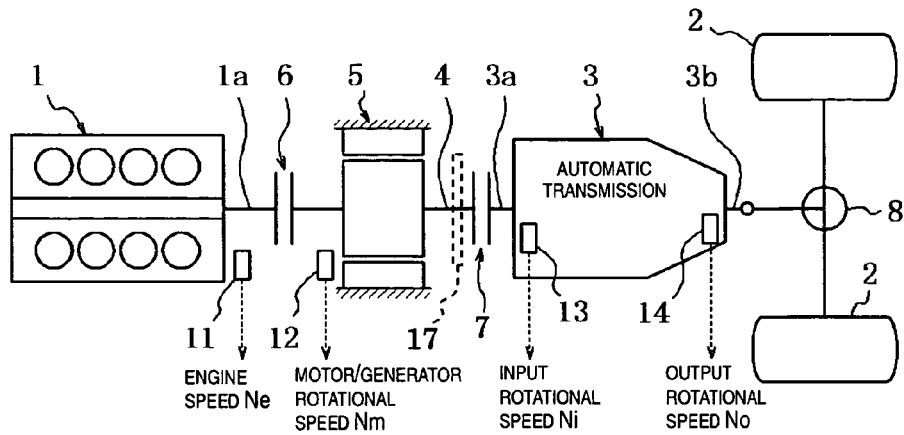
FIG. 1 is a schematic plan view showing a power train of a hybrid vehicle in which a hybrid vehicle control system in accordance with one embodiment of the present invention can be applied.
Figure 2:
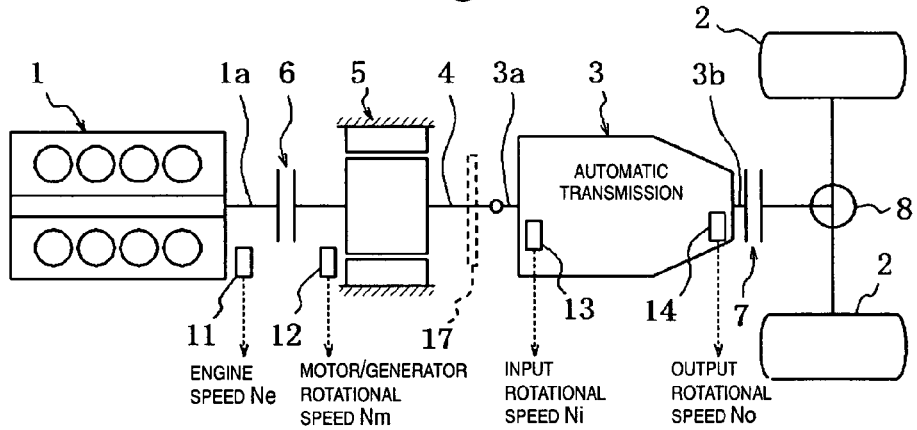
FIG. 2 is a schematic plan view showing a power train of another hybrid vehicle in which the hybrid vehicle control system in accordance with the present invention can be applied.
Figure 3:
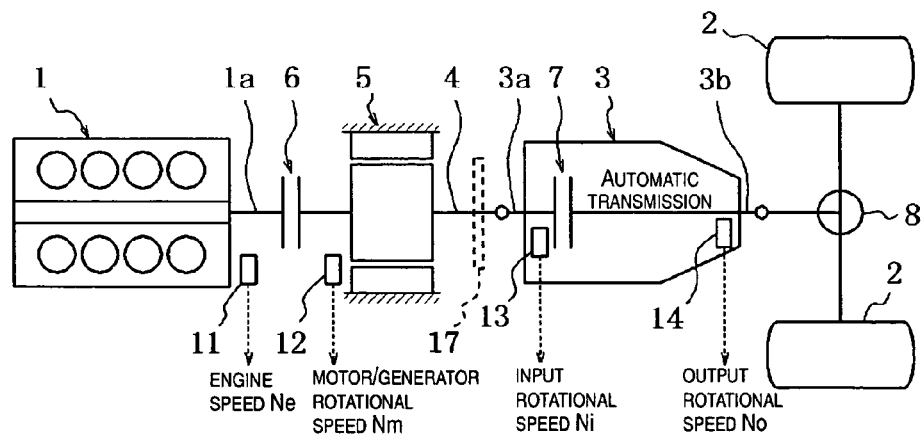
FIG. 3 is a schematic plan view showing a power train of another hybrid vehicle in which the hybrid vehicle control system in accordance with the present invention can be applied.

Referring initially to FIGS. 1 to 3, a front engine/rear wheel drive vehicle (rear wheel drive hybrid vehicle) is illustrated in each of the Figures in which each of the hybrid vehicles is equipped with a hybrid vehicle control system in accordance with one preferred embodiment of the present invention. Basically, the hybrid vehicles of FIGS. 1 to 3 illustrate three examples of alternate power trains of hybrid vehicles in which the hybrid vehicle drive control system in accordance with the present invention can be applied. In these examples, each hybrid vehicle includes, among other things, an internal combustion engine 1 with a crankshaft 1a, a pair of rear drive wheels 2, an automatic transmission 3 with an input shaft 3a, a power transfer shaft 4, a motor/generator 5, a first clutch 6 and a second clutch 7. In the power train of the hybrid vehicle shown in FIG. 1, the automatic transmission 3 is arranged rearward of and in direct alignment (in tandem) with the engine 1 in the same manner as in a regular rear wheel drive automobile. The motor/generator 5 is operatively arranged on the shaft 4 that serves to transfer the rotation of the crankshaft 1a of the engine 1 to the input shaft 3a of the automatic transmission 3. Also, as explained below, an auxiliary device 17 can be installed in the power train of each of the hybrid vehicles of FIGS. 1 to 3 between the motor/generator 5 and the rear drive wheels 2.

The motor/generator 5 is configured and arranged such that it can be used as a motor or an electric generator. The motor/generator 5 is operatively arranged between the engine 1 and the automatic transmission 3. The first clutch 6 is operatively arranged between the motor/generator 5 and the engine 1, i.e., more specifically, between the shaft 4 and the engine crankshaft 1a. The first clutch 6 is configured and arranged to selectively engage or disengage the connection between the engine 1 and the motor/generator 5. The first clutch 6 is configured and arranged such that the torque transfer capacity thereof can be changed either continuously or in a stepwise manner. For example, the first clutch 6 can be a multi-plate wet clutch configured and arranged such that its torque transfer capacity can be changed by controlling the flow rate of a hydraulic clutch fluid (hydraulic oil) and the pressure of the hydraulic clutch fluid (clutch connection hydraulic pressure) either continuously or in a stepwise fashion by a proportional solenoid.

The second clutch 7 is provided between the motor/generator 5 and the automatic transmission 3, i.e., more specifically, between the shaft 4 and the transmission input shaft 3a. The second clutch 7 is configured and arranged to selectively engage or disengage the connection between the motor/generator 5 and the automatic transmission 3. Similarly to the first clutch 6, the second clutch 7 is configured and arranged such that the torque transfer capacity thereof can be changed either continuously or in a stepwise manner. For example, the second clutch 7 can be a multi-plate wet clutch configured such that its torque transfer capacity can be changed by controlling the flow rate of a hydraulic clutch fluid (hydraulic oil) and the pressure of the hydraulic clutch fluid (clutch connection hydraulic pressure) continuously or in a stepwise fashion by a proportional solenoid.

In this embodiment of the present invention, the automatic transmission 3 is preferably a conventional automatic transmission such as one presented in pages C-9 to C-22 of the "Nissan Skyline New Model (CV35) Handbook" published by Nissan Motor Company, Ltd. More specifically, the automatic transmission 3 is configured and arranged such that a plurality of friction elements (clutches and brakes) can be selectively engaged and disengaged and the power transmission path (e.g., first gear, second gear, etc.) is determined based on the combination of the engaged and disengaged friction elements. The automatic transmission 3 is configured and arranged to transfer the rotation of the input shaft 3a to an output shaft 3b after converting the rotation at a gear ratio corresponding to the selected gear. The rotation of the output shaft 3b is distributed to the left and right rear wheels 2 by a differential gear unit 8 and thereby contributes to moving the vehicle. Of course, it will be apparent to those skilled in the art from this disclosure that the automatic transmission 3 is not limited to a step-type automatic transmission like that just described, and it is also acceptable to use a continuously variable transmission (CTV).

When the vehicle is traveling under low load/low speed conditions, such as when the vehicle is starting to move from a stopped state, the vehicle requests an electric drive (EV) mode. Under the EV mode, the power train shown in FIG. 1 is controlled such that the first clutch 6 is released, the second clutch 7 is engaged, and the automatic transmission 3 is in a power transmitting state. When the motor/generator 5 is driven under these conditions, the output rotation of the motor/generator 5 alone is transferred to the transmission input shaft 3a and the transmission 3 transfers the rotation of the input shaft 3a to the transmission output shaft 3b at a gear ratio corresponding to the selected gear. The rotation of the transmission output shaft 3b is then transmitted to the rear wheels 2 through the differential gear unit 8 and the vehicle moves in the EV mode using output from only the motor/generator 5.

When the vehicle is traveling at a high speed, under a large load, or under conditions in which the amount of electric power that can be extracted from the battery is small, the vehicle requests a hybrid drive (HEV) mode. Under the HEV mode, the power train is controlled such that the first clutch 6 and the second clutch 7 are both engaged and the automatic transmission 3 is in a power transmitting state. In this state, the output rotation from the engine 1 or the output rotations from both the engine 1 and the motor/generator 5 are transferred to the transmission input shaft 3a and the transmission 3 transfers the rotation of the input shaft 3a to the transmission output shaft 3b at a gear ratio corresponding to the selected gear. The rotation of the transmission output shaft 3b is then transmitted to the rear wheels 2 through the differential gear unit 8 and the vehicle moves in the HEV mode using output from both the engine 1 and the motor/generator 5 or only the engine 1.

When the vehicle is traveling in the HEV mode and the engine 1 is running at optimum fuel efficiency such that a surplus of energy is produced, the surplus energy is used to operate the motor/generator 5 as an electric generator and, thereby, convert the surplus energy into electric energy. The generated electric energy then can be stored and used to drive the motor/generator 5 as a motor, thereby improving the fuel efficiency of the engine 1.

Although, in FIG. 1, the second clutch 7 (which is configured and arranged to connect and disconnect the motor/generator 5 to and from the drive wheels 2) is disposed between the motor/generator 5 and the automatic transmission 3, the same function can be achieved by disposing the second clutch 7 between the automatic transmission 3 and the differential gear unit 8 as shown in FIG. 2.

Also, instead of providing a dedicated second clutch 7 in front of the automatic transmission 3 as in FIG. 1 or in back of the automatic transmission 3 as in FIG. 2, it is also acceptable to use an existing friction element that is provided inside the automatic transmission 3 for selecting a forward gear or a reverse gear as the second clutch 7, as shown in FIG. 3. In the structure shown in FIG. 3, when the friction element that constitutes the second clutch 7 is engaged so as to execute the mode selection function (i.e., switching between the EV mode and the HEV mode), the same friction element also functions to put the automatic transmission into a power transmitting state. Since a dedicated second clutch is not required in such structure shown in FIG. 3, this arrangement is highly advantageous from the standpoint of cost.

Figure 4:
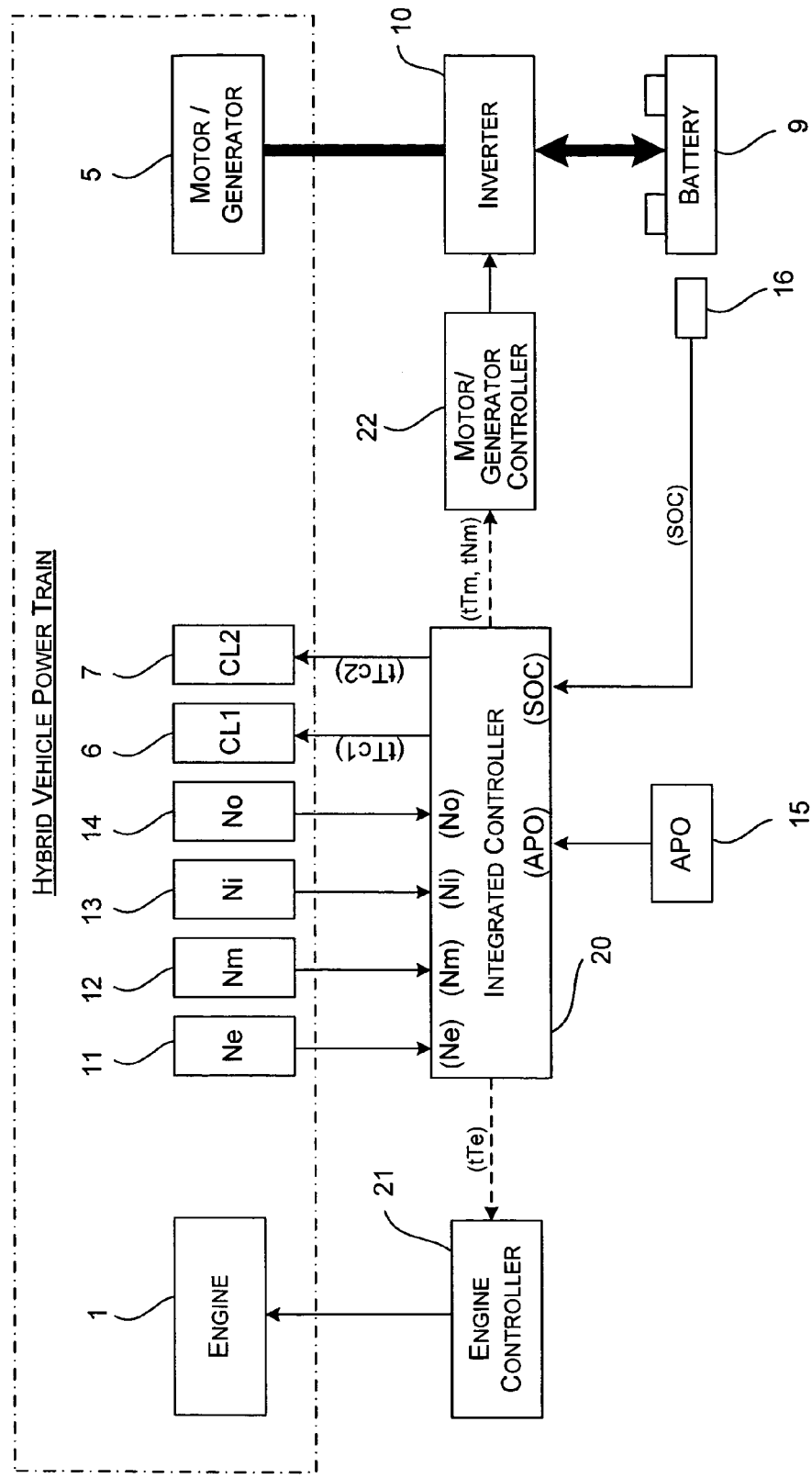
FIG. 4 is a block diagram of the hybrid vehicle control system for the power trains shown in FIGS. 1 to 3.

FIG. 4 is a block diagram illustrating the hybrid vehicle control system for controlling the hybrid vehicle power train comprising the engine 1, the motor/generator 5, the first clutch 6, and the second clutch 7 as shown in FIGS. 1 to 3. In the explanations of the hybrid vehicle control system of the present invention below, the power train shown in FIG. 1 is used as the power train of the hybrid vehicle in which the hybrid vehicle control system is applied. However, it will be apparent to those skilled in the art of this disclosure that this control can be easily adapted to the other power trains shown in FIGS. 2 and 3.

The control system shown in FIG. 4 has an integrated controller 20 that is configured to execute integrated control of the operating point of the power train. The integrated controller 20 is configured to specify the operating point of the power train in this example in terms of a target engine torque tTe, a target motor/generator torque tTm (a target motor/generator rotational speed tNm is also acceptable), a target torque transfer capacity tTc1 of the first clutch 6, and a target torque transfer capacity tTc2 of the second clutch 7.

Generally speaking, the integrated controller 20 is configured to determine the target torque transfer capacity tTc2 of the second clutch 7, which includes a motor/generator torque component or portion and an engine torque component or portion. More specifically, the integrated controller 20 is configured to calculate the motor/generator torque component of the target torque transfer capacity tTc2 based on a motor/generator torque tTm and a torque transfer capacity margin allowance (e.g., safety factor) that is set for the motor/generator torque, and to calculate the engine torque component of the target torque transfer capacity tTc2 based on the target engine torque tTe and a torque transfer capacity margin allowance (e.g., safety factor) that is set for the engine torque when the drive wheels 2 are driven at least by the motor/generator 5. As used herein, the "safety factor" means a margin allowance of a torque transfer capacity of a clutch, which is required to reliably place the clutch in a non-slipping state.

According to the present invention, while traveling by using the drive power from the motor/generator 5 as at least part of the vehicle drive force, the motor/generator torque component of the target second clutch torque transfer capacity tTc2 is derived separately from the engine torque component of the target second clutch torque transfer capacity tTc2 based on the target motor/generator torque tTm and the motor/generator safety factor. Consequently, the safety factor is appropriate for the motor/generator torque share of the drive force, and thus, the torque transfer capacity of the second clutch 7 can be prevented from becoming excessively large. Therefore, the problems related to degradation in fuel economy and a reduction of drive power performance can be avoided.

The integrated controller 20 preferably includes a microcomputer with a hybrid power transmitting control program that controls the operations of the engine 1, the motor/generator 5, and the first and second clutches 6 and 7. In other words, the microcomputer of the integrated controller 20 is programmed to control the operations of the engine 1, the motor/generator 5, and the first and second clutches 6 and 7 as discussed below. The integrated controller 20 also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the integrated controller 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The integrated controller 20 is operatively connected to the following sensors: an engine speed sensor 11, a motor/generator speed sensor 12, a transmission input rotational speed sensor 13, a transmission output rotational speed sensor 14, an accelerator pedal position sensor 15 and a state of charge sensor 16. The engine speed sensor 11, the motor/generator speed sensor 12, the input rotational speed sensor 13, and the output rotational speed sensor 14 are arranged as shown in FIGS. 1 to 3. The engine speed sensor 11 is configured and arranged to detect an engine speed Ne of the engine 1 and produce a signal indicative of the detected engine speed Ne that is inputted to the integrated controller 20. The motor/generator speed sensor 12 is configured and arranged to detect a rotational speed Nm of the motor/generator 5 and produce a signal indicative of the detected rotational speed Nm that is inputted to the integrated controller 20. The transmission input rotational speed sensor 13 is configured and arranged to detect a rotational speed Ni of the input shaft 3a of the automatic transmission 3 and produce a signal indicative of the detected rotational speed Ni that is inputted to the integrated controller 20. The transmission output rotational speed sensor 14 is configured and arranged to detect a rotational speed No of the output shaft 3b of the automatic transmission 3 and produce a signal indicative of the detected rotational speed No that is inputted to the integrated controller 20. The accelerator pedal position sensor 15 is configured and arranged to detect an accelerator pedal depression amount (accelerator position APO) and produce a signal indicative of the detected accelerator pedal depression amount (accelerator position APO) that is inputted to the integrated controller 20. The state of charge sensor 16 is configured and arranged to detect a state of charge SOC (usable electric power) of a battery 9 in which electric power for the motor/generator 5 is stored and produce a signal indicative of the detected state of charge SOC of the battery 9 that is inputted to the integrated controller 20. Thus, the integrated controller 20 receives these input signals for determining the operating point of the power train.

The integrated controller 20 is configured to select a drive (operating or traveling) mode (EV mode or HEV mode) that is capable of delivering the drive force desired by the driver based on the accelerator position APO, the state of charge SOC of the battery 9, and the transmission output rotational speed No (vehicle speed VSP) and computes the target engine torque tTe, the target motor/generator torque tTm (target motor/generator rotational speed tNm also acceptable), the target first clutch torque transfer capacity tTc1, and the target second clutch torque transfer capacity tTc2. The target engine torque tTe is fed to an engine controller 21 and the target motor/generator torque tTm (or the target motor/generator rotational speed tNm) is fed to a motor/generator controller 22.

The engine controller 21 is configured to control the engine 1 such that the engine torque Te becomes equal to the target engine torque tTe, and the motor/generator controller 22 is configured to control the motor/generator 5 through the battery 9 and an inverter 10 such that the torque Tm (or the rotational speed Nm) of the motor/generator 5 becomes equal to the target motor/generator torque tTm (or the target motor/generator rotational speed tNm).

The integrated controller 20 is configured to supply a solenoid current corresponding to the target first clutch torque transfer capacity tTc1 to a connection control solenoid (not shown) of the first clutch 6 and a solenoid current corresponding to the target second clutch torque transfer capacity tTc2 to a connection control solenoid (not shown) of the second clutch 7. In this way, the connection force (holding force) of the first clutch 6 is controlled such that the torque transfer capacity Tc1 of the first clutch 6 becomes equal to the target torque transfer capacity tTc1 and the connection force of the second clutch 7 is controlled such that the torque transfer capacity Tc2 of the second clutch 7 becomes equal to the target torque transfer capacity tTc2.

Figure 5:
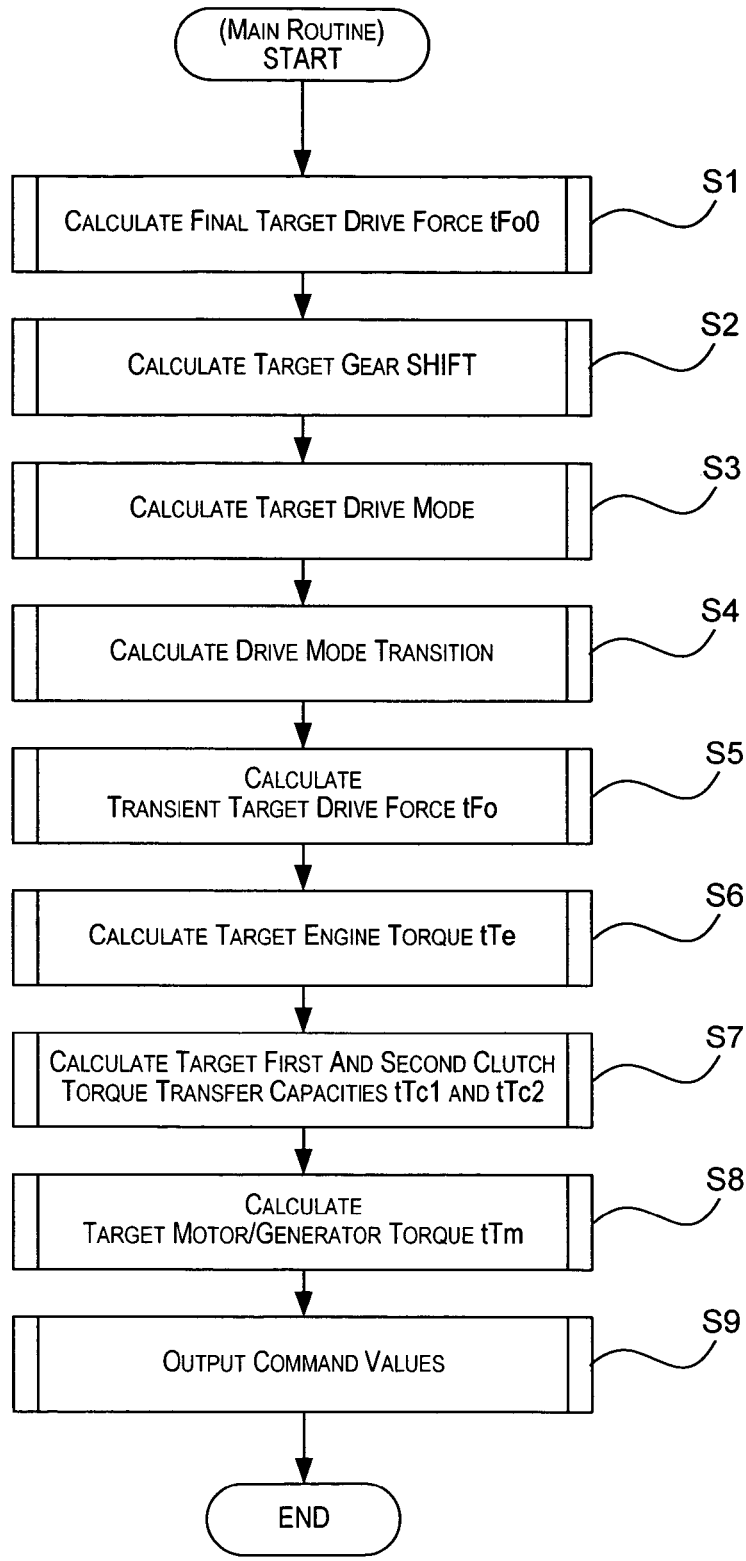
FIG. 5 is a flowchart showing a main routine of a drive force control program executed by an integrated controller of the hybrid vehicle control system in accordance with the illustrated embodiment of the present invention.

FIG. 5 is a flowchart showing a main routine of a control processing executed by the integrated controller 20 for selecting the traveling or drive mode (EV mode or HEV mode) and computing the target engine torque tTe, the target motor/generator torque tTm (or the target motor/generator rotational speed tNm), the target first clutch torque transfer capacity tTc1, and the target second clutch torque transfer capacity tTc2.

First, in step S1, the integrated controller 20 is configured to calculate a final target drive force tFo0 in a steady condition based on the acceleration position opening APO and the vehicle speed VSP using a predetermined final target drive force map.

Next, in step S2, the integrated controller 20 is configured to determine a target gear SHIFT from the acceleration position opening APO and the vehicle speed VSP based on a predetermined gear shift map. In step S2, the integrated controller 20 is configured to issue a command to a gear shift control unit (not shown) of the automatic transmission 3 to shift the automatic transmission 3 to the target gear SHIFT.

In step S3, the integrated controller 20 is configured to use a predetermined target drive mode (EV mode, HEV mode) region map to determine the target drive mode based on the acceleration position opening APO and the vehicle speed VSP.

The target drive mode region map is generally arranged such that the HEV mode is assigned as the target drive mode during high load (large acceleration position opening) and high speed travel, and the EV mode is assigned during low load and low speed travel.

Next, in step S4, the integrated controller 20 is configured to calculate the drive mode transition as follows by comparing the current drive mode and the target drive mode. If the current drive mode and the target drive mode match, then the integrated controller 20 is configured to issue a command to maintain the current drive mode, i.e., the EV mode or the HEV mode. If the current drive mode is the EV mode and the target drive mode is the HEV mode, then the integrated controller 20 is configured to issue a command to switch the mode from the EV mode to the HEV mode. If the current drive mode is the HEV mode and the target drive mode is the EV mode, then the integrated controller 20 is configured to issue a command to switch the mode from the HEV mode to the EV mode. Furthermore, outputting these commands in step S9 either maintains or switches the mode in accordance with those commands.

In step S5, the integrated controller 20 is configured to calculate, based on the current drive force, the moment-by-moment transient target drive force tFo needed to transition to the final target drive force tFo0 (derived in step S1) with a predetermined response characteristic. This calculation can be performed by, for example, passing the final target drive force tFo0 signal through a low pass filter that has a predetermined time constant, and then setting the transient target drive force tFo to the output obtained thereby.

In step S6, the integrated controller 20 is configured to calculate the target engine torque tTe as follows. If the current drive mode is the HEV mode, then a target input torque tTi of the automatic transmission 3 is calculated that will be required in order to attain the transient target drive force tFo using the following equation (1):

$$tTi = tFo \times Rt/if/iG \quad (1)$$

In this equation, the term Rt is the tire effective radius of the drive wheels 2, the term if is the final gear ratio, and the term iG is the gear ratio of the automatic transmission 3, which is determined by the currently selected gear.

Subsequently, the target engine torque tTe is calculated by the equation (2) below, based on the target input torque tTi, the input rotational speed Ni of the automatic transmission 3, the engine rotational speed Ne, and a target charging and discharging electric power tP that corresponds to the state of charge SOC (dischargeable electric power) of the battery 9.

$$tTe = (tTi \times Ni - tP)/Ne \quad (2)$$

Furthermore, if the current drive mode is the EV mode, then engine torque is not needed, and the target engine torque tTe is therefore set to 0.

In step S9, the integrated controller 20 is configured to issue a command to the engine controller 21 (FIG. 4), which performs control so that the engine 1 attains the target engine torque tTe determined as described above.

In step S7, the integrated controller 20 is configured to calculate the target torque transfer capacities tTc1 and tTc2 of the first clutch 6 and the second clutch 7, respectively, by executing the subroutines shown in the flowcharts of FIG. 6 through FIG. 10.

Figure 6:
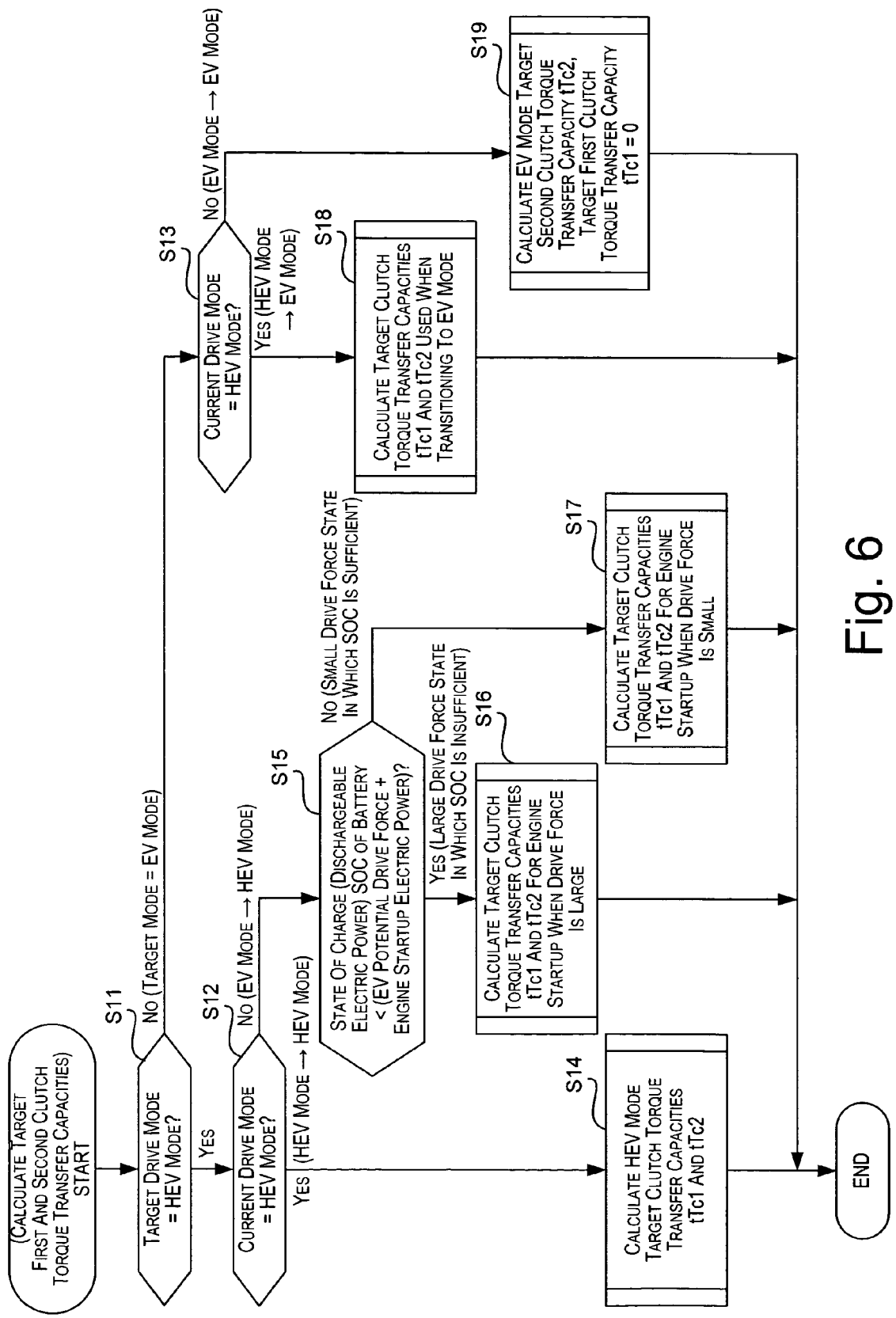
FIG. 6 is a flowchart showing a subroutine of the drive force control program for calculating target first and second clutch torque transfer capacities in accordance with the illustrated embodiment of the present invention.

First, in step S11 in FIG. 6, the integrated controller 20 is configured to determine whether the target drive mode, which was determined in step S3 in FIG. 5, is the HEV mode or not (EV mode). Subsequently, with either result in step S11, the integrated controller 20 is configured to determine whether the current drive mode is the HEV mode or not (EV mode) in step S12 and step S13.

If the integrated controller 20 is configured to determine in step S1 that the target drive mode is the HEV mode, and in step S12 that the current drive mode is also the HEV mode, i.e., if the HEV mode is to be maintained, then, in step S14, the integrated controller 20 is configured to set the target torque transfer capacities tTc1 and tTc2 of the first clutch 6 and the second clutch 7 to target values for the HEV mode, and to control the engagement of the first and second clutches 6 and 7 by issuing commands in step S9 of FIG. 5 to the first clutch 6 and the second clutch 7, as shown in FIG. 4, so that the first and second clutches 6 and 7 attain the target first clutch torque transfer capacity tTc1 and the target second clutch torque transfer capacity tTc2, respectively.

The method of deriving the target second clutch torque transfer capacity tTc2, particularly for the HEV mode, according to the essence of the present invention will now be discussed in detail below, referencing FIG. 7.

First, in step S21, the integrated controller 20 is configured to calculate the vehicle transient response component or portion of the second clutch torque transfer capacity tTc2 by multiplying the target input shaft torque tTi, which was derived by the abovementioned equation (1), by the vehicle transient response safety factor.

Next, in step S22, the integrated controller 20 is configured to calculate the engine torque share (engine torque component) of the second clutch torque transfer capacity by multiplying the target engine torque tTe, which was derived in the abovementioned equation (2), by the engine safety factor (e.g., 1.3).

Furthermore, in step S23, the integrated controller 20 is configured to calculate the motor/generator torque share (motor/generator torque component) of the second clutch torque transfer capacity by multiplying the target motor/generator torque tTm, which is derived as discussed later with reference to FIG. 12, by the motor/generator safety factor (e.g., 1.0).

Subsequently, in step S24, the integrated controller 20 is configured to calculate the clutch response component or portion of the second clutch torque transfer capacity by multiplying the target input shaft torque tTi, which was derived by the equation (1), by the clutch response safety factor.

Furthermore, in step S25, the integrated controller 20 is configured to calculate the inertia torque component or portion of the second clutch torque transfer capacity by the following calculation. More specifically, the integrated controller 20 is configured to calculate the motor/generator rotational speed variation of one calculation period by first subtracting the previous value of the motor/generator rotational speed Nm from its current value. Subsequently, the integrated controller 20 is configured to calculate the total inertia by summing the rotational inertia of the engine 1, the rotational inertia of the first clutch 6, and the rotational inertia of the motor/generator 5. Lastly, the integrated controller 20 is configured to calculate the inertia torque component of the second clutch torque transfer capacity by dividing the product of the motor/generator rotational speed variation and the total inertia by the calculation (sample) period.

In step S26, the integrated controller 20 is configured to set the target second clutch torque transfer capacity tTc2 to a sum value of the vehicle transient response component of the second clutch torque transfer capacity derived in step S21, the engine's torque share of the second clutch torque transfer capacity derived in step S22, the motor/generator torque share of the second clutch torque transfer capacity derived in step S23, the clutch response component of the second clutch torque transfer capacity derived in step S24, and the inertia torque component of the second clutch torque transfer capacity derived in step S25.

Referring back to FIG. 6, if it is determined in step S11 that the target drive mode is the HEV mode, and in step S12 that the current drive mode is the EV mode, i.e., that the mode is to be switched from the EV mode to the HEV mode, then, in step S15, the integrated controller 20 is configured to determine whether the state of charge SOC (dischargeable electric power) of the battery 9 is less than the sum value of the EV potential drive force and the engine startup electric power. In other words, the integrated controller 20 is configured to determine whether there is a request for a large drive force for which the state of charge SOC (dischargeable electric power) of the battery 9 is insufficient. If there is a request for a large drive force for which the state of charge SOC (dischargeable electric power) of the battery 9 is insufficient (Yes in step S15), then, in step S16, the target clutch torque transfer capacities tTc1 and tTc2 of the first and second clutches 6 and 7 are respectively set to the target clutch torque transfer capacities for engine startup when the drive force is large.

These target clutch torque transfer capacities for engine startup when the drive force is large are determined as follows by executing the control program shown in the flowchart of FIG. 8.

Figure 8:
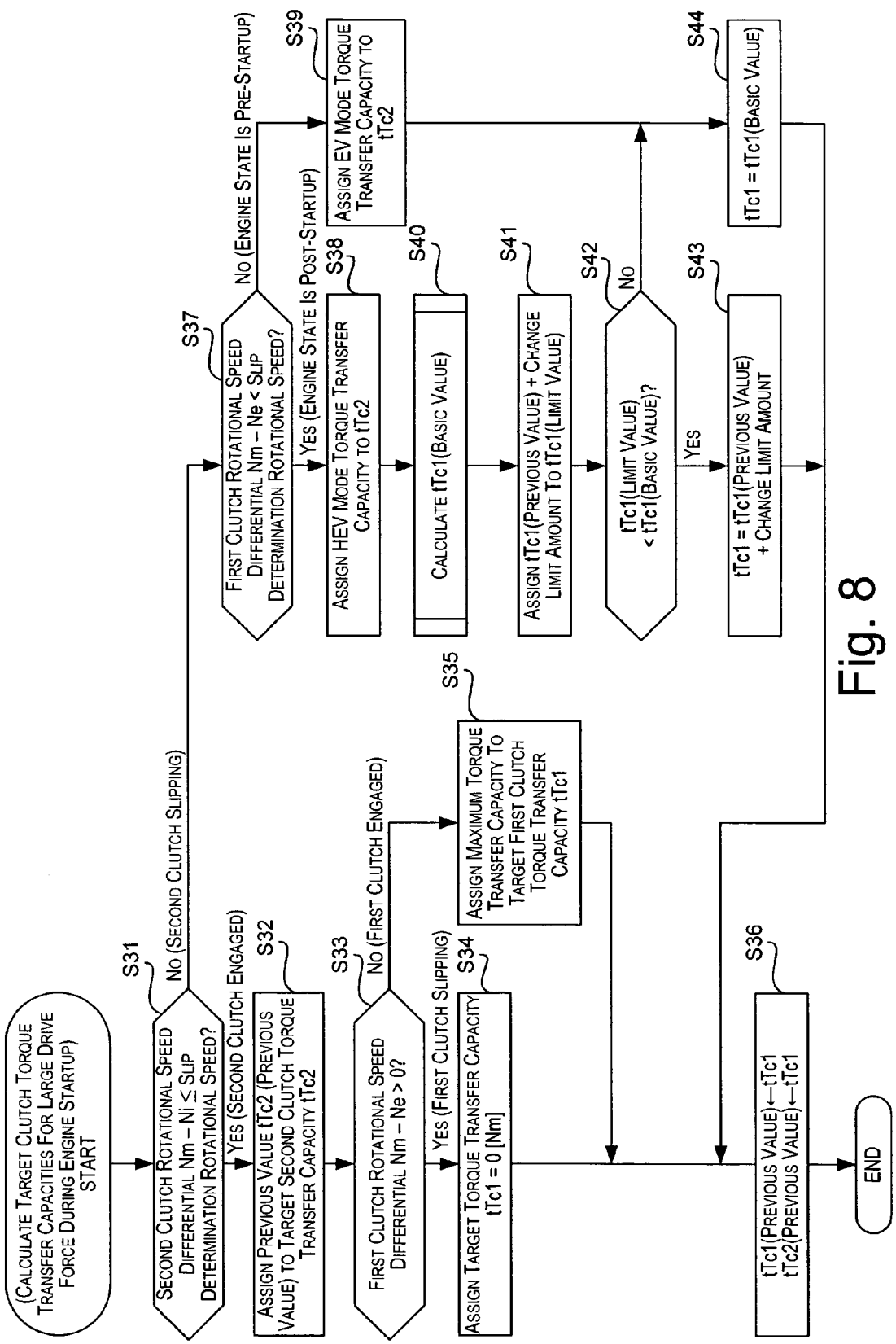
FIG. 8 is a flowchart showing a subroutine of the control process illustrated in FIG. 6 for calculating the target first and second clutch torque transfer capacities used when drive force is large during engine startup in accordance with the illustrated embodiment of the present invention.

First, in step S31 in FIG. 8, the integrated controller 20 is configured to determine whether the second clutch 7 is in an engaged state or a slipping state by determining whether the slip rotational speed (=Nm−Ni), which is the front-rear (in-out) rotational speed differential of the second clutch 7, is less than a slip determination rotational speed.

If the second clutch 7 is in the engaged state (Yes in step S31), then the torque transfer capacity of the second clutch 7 is fine as is, and thus, in step S32, the previous value of the target clutch torque transfer capacity tTc2 is assigned to the current target clutch torque transfer capacity tTc2 in order to maintain the previous value.

Next, in step S33, the integrated controller 20 is configured to determine whether the first clutch 6 is in the slipping state or the engaged state by determining whether the slip rotational speed (=Nm−Ne), which is the front-rear (in-out) rotational speed differential of the first clutch 6, is greater than 0.

If the first clutch 6 is in the slipping state (Yes in step S33), then, in step S34, the integrated controller 20 is configured to set the target first clutch torque transfer capacity tTc1 to 0. On the other hand, if the first clutch 6 is in the engaged state (No in step S33), then, in step S35, the integrated controller 20 is configured to set the target first clutch torque transfer capacity tTc1 to the maximum torque transfer capacity for the first clutch 6.

With the control processing described above, the integrated controller 20 is configured to determine the target second clutch torque transfer capacity tTc2 and the target first clutch torque transfer capacity tTc1 for use when switching from the EV mode to the HEV mode. Then, the integrated controller 20 is configured to assign the target second clutch torque transfer capacity tTc2 and the target first clutch torque transfer capacity tTc1 calculated in the current sample period to tTc2 (previous value) and tTc1 (previous value), respectively, in step S36 so that these values will be used as the previous values in the next sample period.

If it is determined in step S31 that the second clutch 7 is in the slipping state (No in step S31), then, in step S37, the integrated controller 20 is configured to determine whether the engine startup state is pre-startup or post-startup by determining whether the slip rotational speed (=Nm−Ne) of the first clutch 6 is less than the slip determination rotational speed.

If the engine is in the post-startup state (Yes in step S37), then, in step S38, the integrated controller 20 is configured to set the target second clutch torque transfer capacity tTc2 to the torque transfer capacity for the HEV mode, which was derived as discussed earlier referencing FIG. 7. On the other hand, if the engine 1 is in the pre-startup state (No in step S37), then, in step S39, the integrated controller 20 is configured to set the target second clutch torque transfer capacity tTc2 to the torque transfer capacity for the EV mode, which is derived as discussed later with reference to FIG. 10.

After the integrated controller 20 determines that the engine 1 is in the post-startup state in step S37 and sets the target second clutch torque transfer capacity tTc2 to the torque transfer capacity for the HEV mode in step S38, in step S40, the integrated controller 20 is configured to calculate a basic value tTc1 (basic value) of the target first clutch torque transfer capacity tTc1. In step S41, the integrated controller 20 is configured to set a limit value tTc1 (limit value) of the target first clutch torque transfer capacity tTc1 to the sum of the previous value tTc1 (previous value) of the target first clutch torque transfer capacity tTc1 and a change limit amount.

Next, in step S42, the integrated controller 20 is configured to determine whether the limit value tTc1 (limit value) is less than the basic value tTc1 (basic value). If the limit value tTc1 (limit value) is less than the basic value tTc1 (basic value) (Yes in step S42), then, in step S43, the integrated controller 20 is configured to calculate the target first clutch torque transfer capacity tTc1 by adding the previous value tTc1 (previous value) to the change limit amount (i.e., tTc1=tTc1 (previous value)+change limit amount).

On the other hand, if it is determined in step S37 that the engine 1 is in the pre-startup state (No in step S37), the target second clutch torque transfer capacity tTc2 is set to the torque transfer capacity for the EV mode in step S39, then, in step S44, the target first clutch torque transfer capacity tTc1 is set to tTc1 (basic value). Also, if it is determined that tTc1 (limit value) is greater than or equal to tTc1 (basic value) in step S42, then, in step S44, the target first clutch torque transfer capacity tTc1 is set to tTc1 (basic value).

With the control processing described above, the integrated controller 20 is configured to determine the target second clutch torque transfer capacity tTc2 and the target first clutch torque transfer capacity tTc1 for use when switching from the EV mode to the HEV mode. As mentioned above, in step S36, the integrated controller 20 is configured to assign the target second clutch torque transfer capacity tTc2 and target first clutch torque transfer capacity tTc1 calculated in the current sample period respectively to tTc2 (previous value) and tTc1 (previous value) so that these values will be used as the previous values in the next sample period.

Referring back to FIG. 6, if it is determined in step S15 that there is a request for a small drive force for which the state of charge SOC (dischargeable electric power) of the battery 9 is sufficient, then, in step S17, the target clutch torque transfer capacities tTc1 and tTc2 of the first and second clutches 6 and 7 are set to the target clutch torque transfer capacities for engine startup when the drive force is small. When there is a request for a small drive force, the motor/generator 5 does not function as a motor but rather as a generator that generates electricity by the surplus drive power from the engine 1. Thus, it is not possible to determine the target torque transfer capacity tTc2 of the second clutch 7 for the torque share of the motor/generator 5 using a small motor/generator safety factor, as in step S16 (i.e., step S38 in FIG. 8) or as in FIG. 7. Therefore, when there is a request for a small drive force, the target torque transfer capacity tTc2 of the second clutch 7 is determined using the relatively large engine safety factor as in the conventional hybrid vehicle control system.

By issuing commands in step S9 of FIG. 5 to the first clutch 6 and the second clutch 7, as shown in FIG. 4, with the command values of the target first clutch torque transfer capacity tTc1 and the target second clutch torque transfer capacity tTc2, which were determined in step S16 (refer to FIG. 8 for details) and step S17 as discussed above, the integrated controller 20 is configured to control the engagement of the clutches 6 and 7 so that the torque transfer capacities of the first and second clutches 6 and 7 reach the target first clutch torque transfer capacity tTc1 and the target second clutch torque transfer capacity tTc2, respectively.

Referring back to FIG. 6, if it is determined in step S11 that the target drive mode is the EV mode (No in step S11), and in step S13 that the current drive mode is the HEV mode (Yes in step S13), i.e., if switching the drive mode from the HEV mode to the EV mode, then, in step S18, the target clutch torque transfer capacities tTc1 and tTc2 of the first clutch 6 and the second clutch 7 are set to the target values for use when transitioning from the HEV mode to the EV mode.

Figure 9:
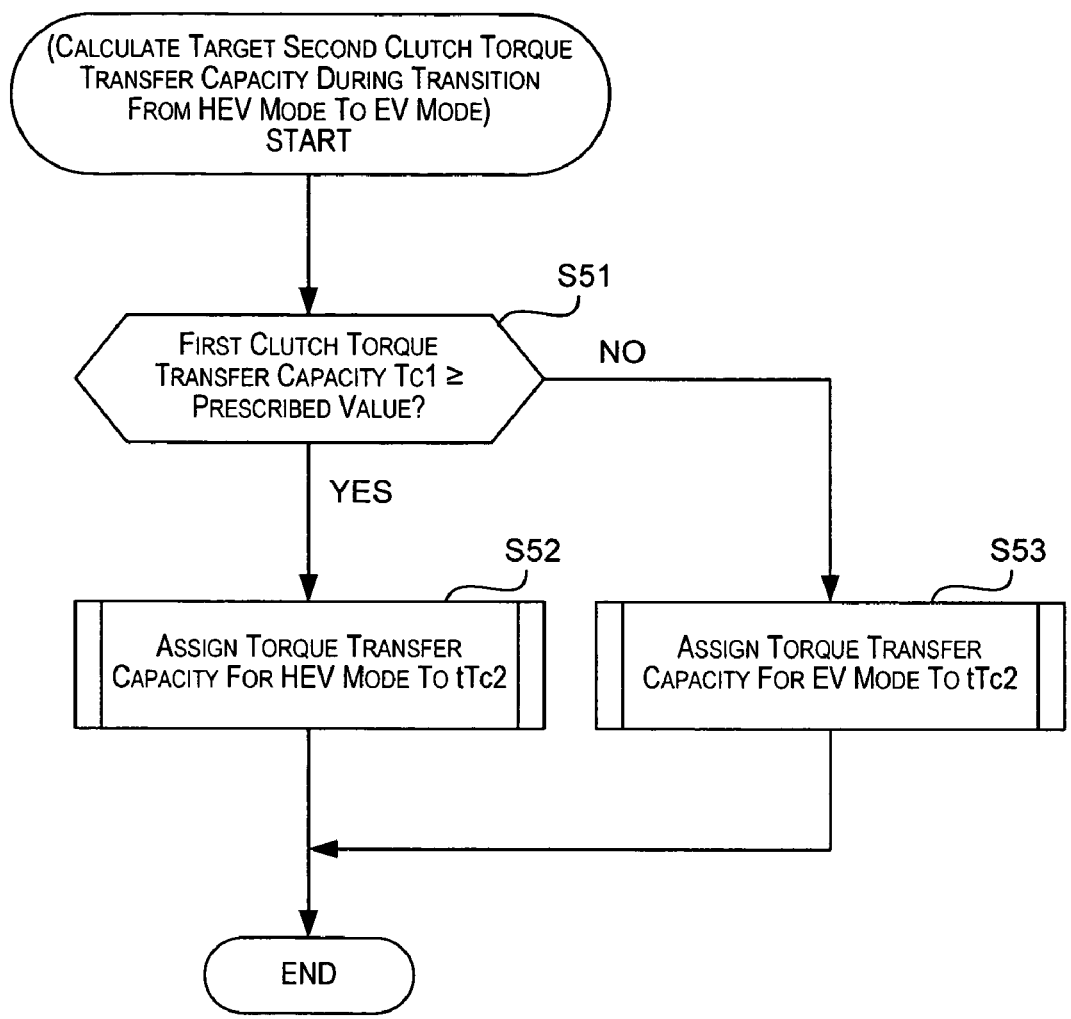
FIG. 9 is a flowchart showing a subroutine of the control process illustrated in FIG. 6 for calculating the target second clutch torque transfer capacity during transition from the HEV mode to the EV mode in accordance with the illustrated embodiment of the present invention.

The method of determining the target second clutch torque transfer capacity tTc2, particularly for use when switching from the HEV mode to the EV mode, according to the essence of the present invention will now be discussed in detail, referencing FIG. 9.

In step S51, the integrated controller 20 is configured to determine whether the switch of the drive mode from the HEV mode to the EV mode is incomplete by determining whether the actual torque transfer capacity Tc1 of the first clutch 6 is greater than or equal to a prescribed value for determining that the switch is incomplete.

When the actual torque transfer capacity Tc1 of the first clutch 6 is greater than or equal to the prescribed value in step S51, the switch from the HEV mode to the EV mode is still incomplete, and control therefore proceeds to step S52, wherein the integrated controller 20 is configured to set the target second clutch torque transfer capacity tTc2 to the torque transfer capacity for the HEV mode, which was derived as discussed earlier with reference to FIG. 7.

On the other hand, if the integrated controller 20 determines in step S51 that the actual torque transfer capacity Tc1 of the first clutch 6 is less than the prescribed value, then the switch from the HEV mode to the EV mode is complete, and control therefore proceeds to step S53, wherein the integrated controller 20 is configured to set the target second clutch torque transfer capacity tTc2 to the torque transfer capacity for the EV mode, which is derived as discussed later referencing FIG. 10.

Referring back to FIG. 6, if it is determined in step S11 that the target drive mode is the EV mode (No in step S11), and in step S13 that the current drive mode is the EV mode (No in step S113), i.e., if the EV mode is to be maintained, then, in step S119, the integrated controller 20 is configured to set the target torque transfer capacity tTc2 of the second clutch 7 to the target value for the EV mode, and to set the target torque transfer capacity tTc1 of the first clutch 6 to 0 for the EV mode.

The target first clutch torque transfer capacity tTc1 and the target second clutch torque transfer capacity tTc2 for the EV mode are derived as follows by executing the control program shown in the flowchart of FIG. 10.

Figure 10:
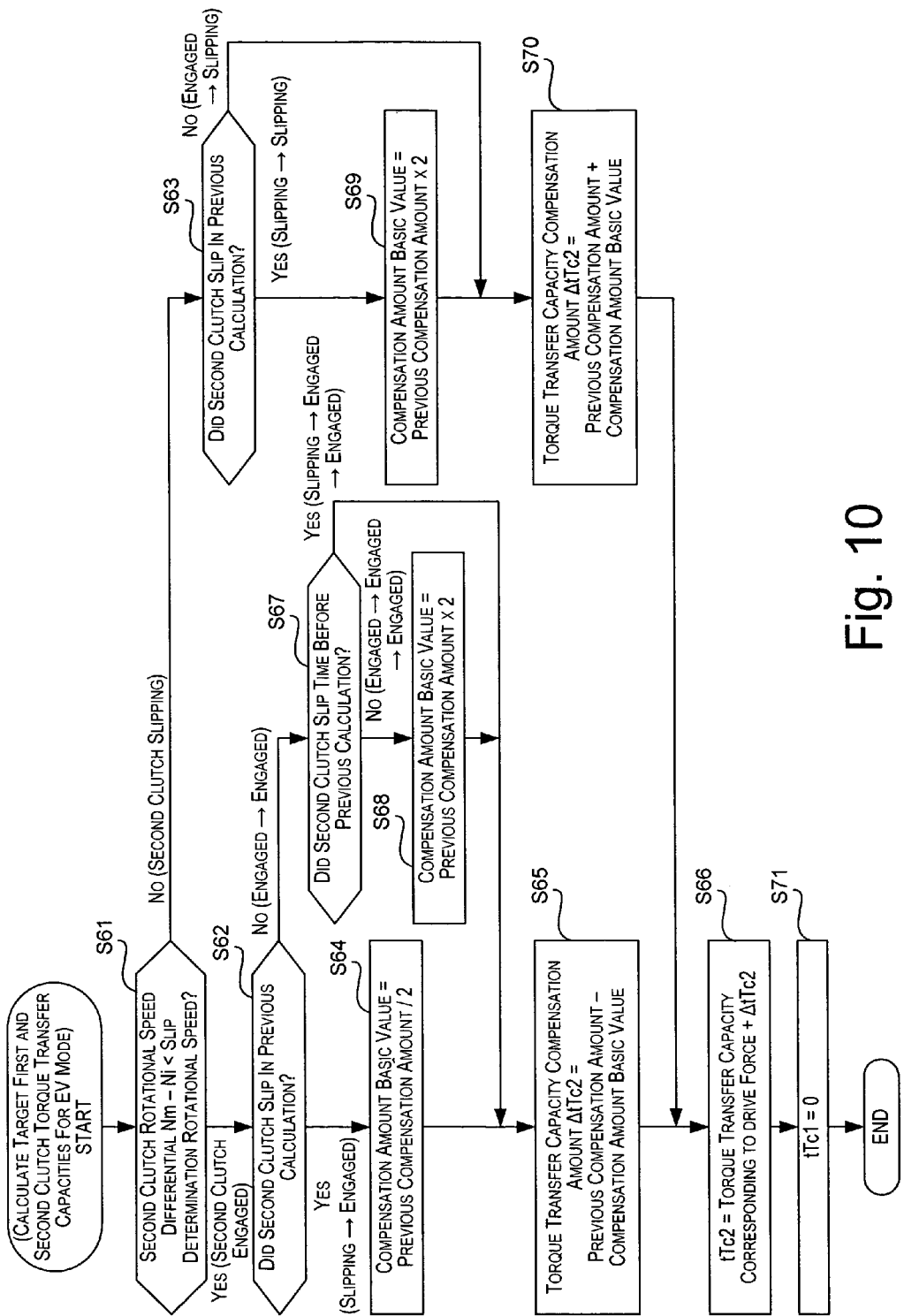
FIG. 10 is a flowchart showing a subroutine of the control process illustrated in FIG. 6 for calculating the target first and second clutch transfer capacities for the EV mode in accordance with the illustrated embodiment of the present invention.

First, in step S61 in FIG. 10, the integrated controller 20 is configured to determine whether the second clutch 7 is currently in the engaged state or in the slipping state by determining whether the slip rotational speed (=Nm−Ni) of the second clutch 7 is less than the slip determination rotational speed.

In either determination result in step S61, the integrated controller 20 is configured to determine in step S62 and step S63 whether the second clutch 7 was determined to be in the slipping state in the previous calculation.

If it is determined in step S61 that the second clutch 7 is in the engaged state in the current calculation (Yes in step S61), and in step S62 that the second clutch 7 was in the slipping state in the previous calculation (Yes in step S62), i.e., if the second clutch 7 changed from the slipping state to the engaged state, then it is the point in time immediately after the second clutch 7 has reached the torque transfer capacity, i.e., the torque capacity that corresponds to the drive force to be transmitted, at which the second clutch 7 just barely does not slip. Thus, in step S64, the integrated controller 20 is configured to set a torque capacity compensation amount basic value of the second clutch 7 to half of the previous compensation amount. Furthermore, in step S65, the integrated controller 20 is configured to calculate a torque transfer capacity compensation amount ΔtTc2 by subtracting the abovementioned torque capacity compensation amount basic value from the previous compensation amount. Next, in step S66, the integrated controller 20 is configured to set the target torque transfer capacity tTc2 of the second clutch 7 to the sum of the torque transfer capacity, which corresponds to the drive force tFo, and the torque transfer capacity compensation amount ΔtTc2. Finally, in step S71, the integrated controller 20 is configured to set the target torque transfer capacity tTc1 of the first clutch 6 to 0.

If it is determined in step S61 that the second clutch 7 is in the engaged state (Yes in step S61), and in step S62 that the second clutch 7 was not in the slipping state in the previous calculation (No in step S61), i.e., that the second clutch 7 has maintained the engaged state in the previous and current calculations, then, in step S67, the integrated controller 20 is configured to determine whether the second clutch 7 was in the slipping state in the calculation that was made the calculation period before the last calculation period.

If it is determined in step S67 that the second clutch 7 was not in the slipping state in the calculation that was made the time before last, i.e., that the second clutch 7 has maintained the engaged state in the calculation that was made the calculation period before the last calculation period, in the previous calculation, and in the current calculation (No in step S67), then the torque transfer capacity of the second clutch 7 is excessive with respect to the drive force to be transmitted. Thus, in step S68, the integrated controller 20 is configured to set the torque capacity compensation amount basic value of the second clutch 7 to twice the previous compensation amount. Furthermore, in step S65, the integrated controller 20 is configured to calculate the torque transfer capacity compensation amount ΔtTc2 by subtracting the abovementioned torque capacity compensation amount basic value from the previous compensation amount. Next, in step S66, the integrated controller 20 is configured to set the target torque transfer capacity tTc2 of the second clutch 7 to the sum of the torque transfer capacity, which corresponds to the drive force tFo, and the abovementioned torque transfer capacity compensation amount ΔtTc2. Finally, in step S71, the integrated controller 20 is configured to set the target torque transfer capacity tTc1 of the first clutch 6 to 0.

However, if it is determined in step S67 that the second clutch 7 was in the slipping state in the calculation that was made the time before last, i.e., if the second clutch 7 was in the slipping state in the calculation that was made the calculation period before the last calculation period, and the second clutch 7 was then in the engaged state for the following two calculations (the previous calculation and the current calculation) (Yes in step S67), then the torque transfer capacity of the second clutch 7 is somewhat large with respect to the drive force to be transmitted. Therefore, without correcting the torque capacity compensation amount basic value of the second clutch 7 as in step S64 and step S68, control proceeds to step S65, wherein the integrated controller 20 is configured to calculate the torque transfer capacity compensation amount $\Delta tTc2$ by subtracting the abovementioned torque capacity compensation amount basic value from the previous compensation amount. Next, in step S66, the integrated controller 20 is configured to set the target torque transfer capacity tTc2 of the second clutch 7 to the sum of the torque transfer capacity, which corresponds to the drive force tFo, and the abovementioned torque transfer capacity compensation amount $\Delta tTc2$. Finally, in step S71, the integrated controller 20 is configured to set the target torque transfer capacity tTc1 of the first clutch 6 to 0.

If it is determined in step S61 that the second clutch 7 is in the slipping state (No in step S61), and in step S63 that the second clutch 7 was in the slipping state in the previous calculation (Yes in step S63), i.e., if the second clutch 7 has maintained the slipping state for two calculation, then the torque transfer capacity of the second clutch 7 is greatly insufficient with respect to the drive force to be transmitted. Therefore, in step S69, the integrated controller 20 is configured to set the torque capacity compensation amount basic value of the second clutch 7 to twice the previous compensation amount. In step S70, the integrated controller 20 is configured to calculate the torque transfer capacity compensation amount $\Delta tTc2$ by calculating the sum of the previous compensation amount and the abovementioned torque capacity compensation amount basic value. Next, in step S66, the integrated controller 20 is configured to set the target torque transfer capacity tTc2 of the second clutch 7 to the sum of the torque transfer capacity, which corresponds to the drive force tFo, and the abovementioned torque transfer capacity compensation amount $\Delta tTc2$. Finally, in step S71, the integrated controller 20 is configured to set the target torque transfer capacity tTc1 of the first clutch 6 to 0.

However, if it is determined in step S61 that the second clutch 7 is in the slipping state (No in step S61), and in step S63 that the second clutch 7 was not in the slipping state in the previous calculation (No in step S61), i.e., that the second clutch 7 has transitioned from the engaged state to the slipping state, then the torque transfer capacity of the second clutch 7 is somewhat insufficient with respect to the drive force to be transmitted. Thus, without correcting the torque capacity compensation amount basic value as in step S69, the integrated controller 20 is configured to determine the torque transfer capacity compensation amount $\Delta tTc2$ in step S70 by calculating the sum of the previous compensation amount and the torque capacity compensation amount basic value. Next, in step S66, the integrated controller 20 is configured to set the target torque transfer capacity tTc2 of the second clutch 7 to the sum of the torque transfer capacity, which corresponds to the drive force tFo, and the abovementioned torque transfer capacity compensation amount $\Delta tTc2$. Finally, in step S71, the integrated controller 20 is configured to set the target torque transfer capacity tTc1 of the first clutch 6 to 0.

The integrated controller 20 is configured to control the engagement of the clutches 6 and 7 so that the torque transfer capacities of the clutches 6 and 7 attain the target clutch torque transfer capacities tTc1 and tTc2 by issuing a command in step S9 of FIG. 5 to the first clutch 6 and the second clutch 7, as shown in FIG. 4, with the command values of the target torque transfer capacity tTc1 of the first clutch 6 and the target torque transfer capacity tTc2 of the second clutch 7, which were derived in step S19 of FIG. 6, as shown in the flowchart of FIG. 10.

Referring back to FIG. 5, in step S8, after the first and second clutch target clutch torque transfer capacities tTc1 and tTc2 have been determined as mentioned in step S7 of FIG. 5 (FIGS. 6 to 10), the integrated controller 20 is configured to calculate the target motor/generator torque tTm by executing the subroutines shown in the flowcharts of FIG. 11 through FIG. 14.

Figure 11:
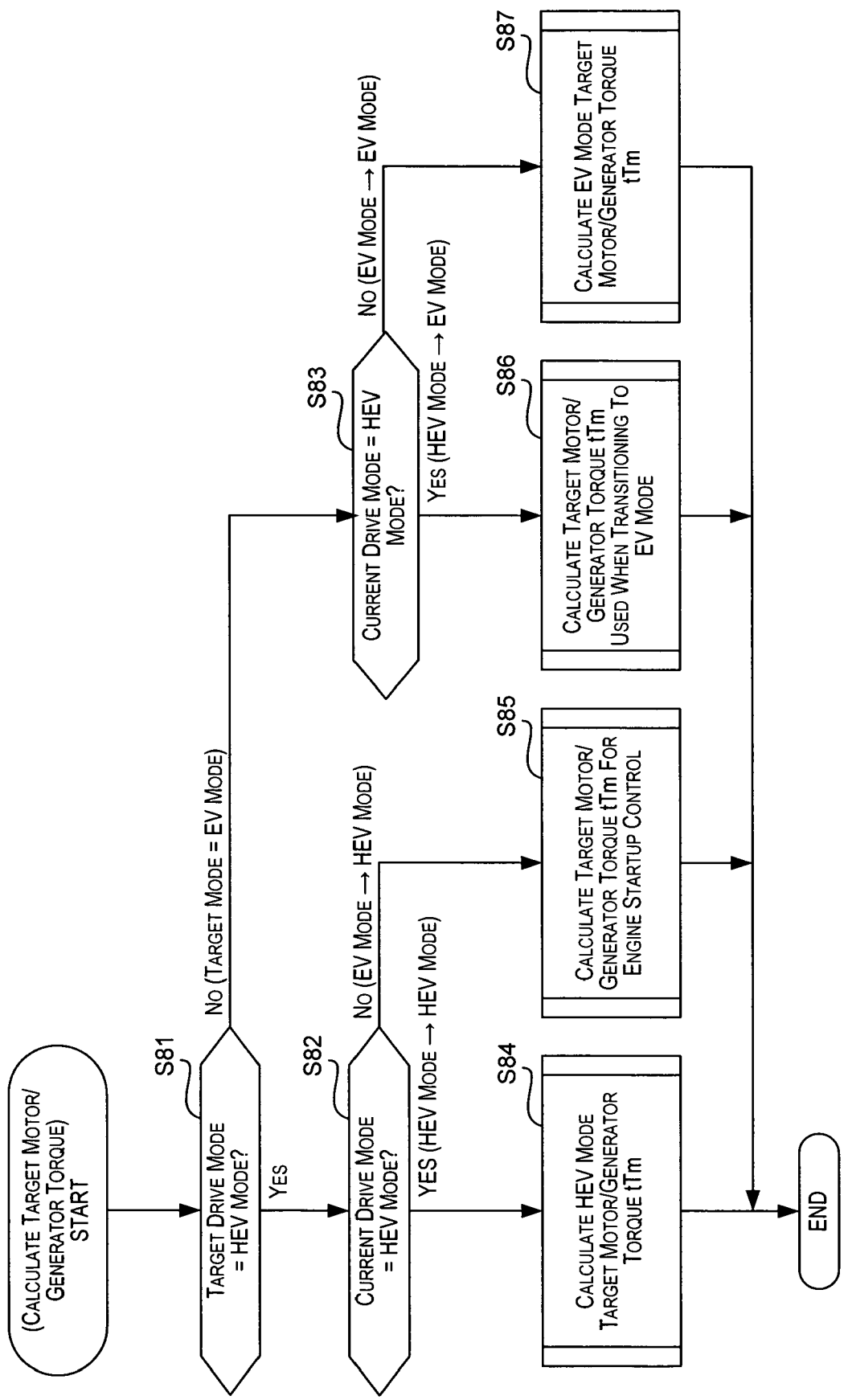
FIG. 11 is a flowchart showing a subroutine of the control process illustrated in FIG. 5 for calculating a target motor/generator torque in accordance with the illustrated embodiment of the present invention.

First, in step S81 of FIG. 11, the integrated controller 20 is configured to determine whether the target drive mode derived in step S3 of FIG. 5 is the HEV mode or not (EV mode). Subsequently, with either determination result in step S81, the integrated controller 20 is configured to determine in step S82 and step S83 whether the current drive mode is the HEV mode or not (EV mode).

If it is determined in step S81 that the target drive mode is the HEV mode (Yes in step S81), and in step S82 that the current drive mode is also the HEV mode (Yes in step S82), i.e., the HEV mode is to be maintained, then, in step S84, the integrated controller 20 is configured to set the target torque tTm of the motor/generator 5 to the target value for the HEV mode.

Figure 12:
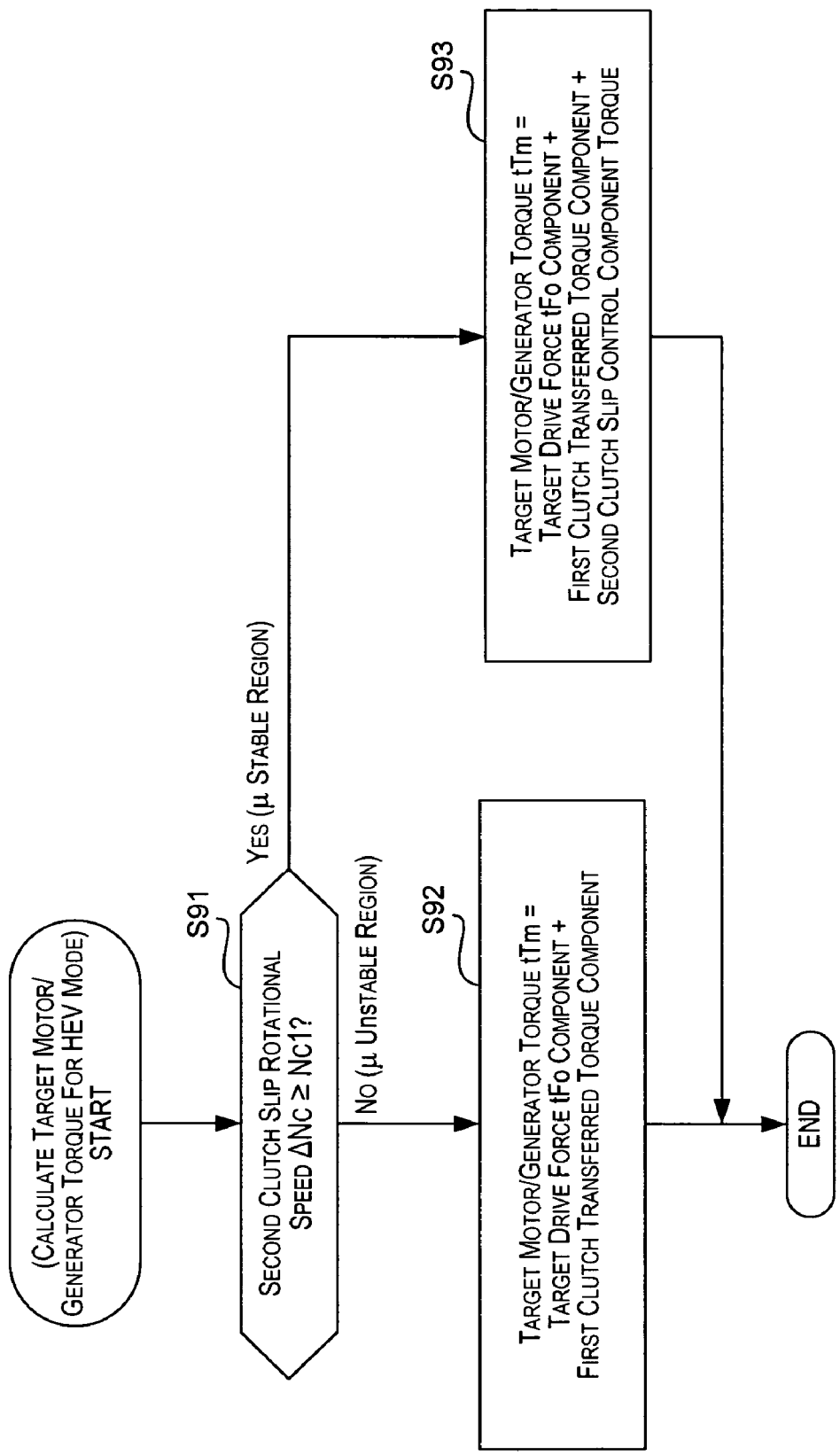
FIG. 12 is a flowchart showing a subroutine of the control process illustrated in FIG. 11 for calculating the target motor/generator torque for the HEV mode in accordance with the illustrated embodiment of the present invention.

The target motor/generator torque tTm for the HEV mode is determined as described in FIG. 12. In step S91 in FIG. 12, the integrated controller 20 is configured to determine whether a slip rotational speed $\Delta Nc$ ($=Nm-Ni$) of the second clutch 7 is greater than or equal to a prescribed slip rotational speed $\Delta Nc1$.

The prescribed slip rotational speed $\Delta Nc1$ used in step S91 will now be explained. As is true for all clutches, the change characteristics of the clutch coefficient of friction R with respect to the slip rotational speed $\Delta Nc$ ($=Nm-Ni$) of the second clutch 7 is as follows. Normally, over the range of slip rotational speeds that approximately encompass the slip rotational speeds wherein the coefficient of friction $\mu$ is at its maximum, the percentage change of the clutch coefficient of friction $\mu$ with respect to the slip rotational speed is a relatively large region where the coefficient of friction is unstable. Furthermore, when the range of the slip rotational speeds goes beyond that and is large, i.e., greater than or equal to the abovementioned prescribed slip rotational speed $\Delta Nc1$, then the percentage change of the clutch coefficient of friction $\mu$ with respect to the slip rotational speed is a comparatively small region where the coefficient of friction is stable.

If feedback control of the motor/generator torque tTm is performed so that the slip rotational speed of the second clutch 7 reaches the target value in the unstable coefficient of friction region where $\Delta Nc < \Delta Nc1$, then the coefficient of friction of the second clutch 7 changes greatly with just a slight change in the torque, and the torque transfer capacity of the second clutch 7 also changes greatly, which generates clutch judder. Therefore, it is preferable to perform feedback control in the stable coefficient of friction region where $\Delta Nc \geq \Delta Nc1$, and to perform feedforward control in the unstable coefficient of friction region where $\Delta Nc < \Delta Nc1$.

From the viewpoint of the present embodiment, in step S91 of FIG. 12, the integrated controller 20 is configured to determine whether the coefficient of friction $\mu$ is in the stable region or in the unstable region by determining whether the slip rotational speed $\Delta Nc$ of the second clutch 7 is greater than or equal to the prescribed slip rotational speed $\Delta Nc1$.

If it is determined in step S91 that the coefficient of friction μ is in the unstable region where ΔNc<ΔNc1 (No in step S91), then, in step S92, feedback control of the target motor/generator torque tTm is performed so that the target motor/generator torque tTm matches the sum of the drive force tFo component and the first clutch transferred torque component. If it is determined in step S91 that the coefficient of friction μ is in the stable region where ΔNc≧ΔNc1 (Yes in step S91), then, in step S93, feedback control of the target motor/generator torque tTm is performed so that the target motor/generator torque tTm matches the sum of the drive force tFo component, the first clutch transferred torque component and the second clutch slip control component of the torque. In this manner, the integrated controller 20 is configured to issue a command in step S9 of FIG. 5 to the motor/generator controller 22, as shown in FIG. 4, with a command value of the target motor/generator torque tTm, which was derived as described above with reference to FIG. 12.

Referring back to FIG. 11, if it is determined in step S81 that the target drive mode is the HEV mode (Yes in step S81), and in step S82 that the current drive mode is the EV mode (No in step S82), i.e., that the mode is to be switched from the EV mode to the HEV mode, then, in step S85, the integrated controller 20 is configured to set the target torque tTm of the motor/generator 5 to the required target value for starting up the engine when switching from the EV mode to the HEV mode.

Figure 13:
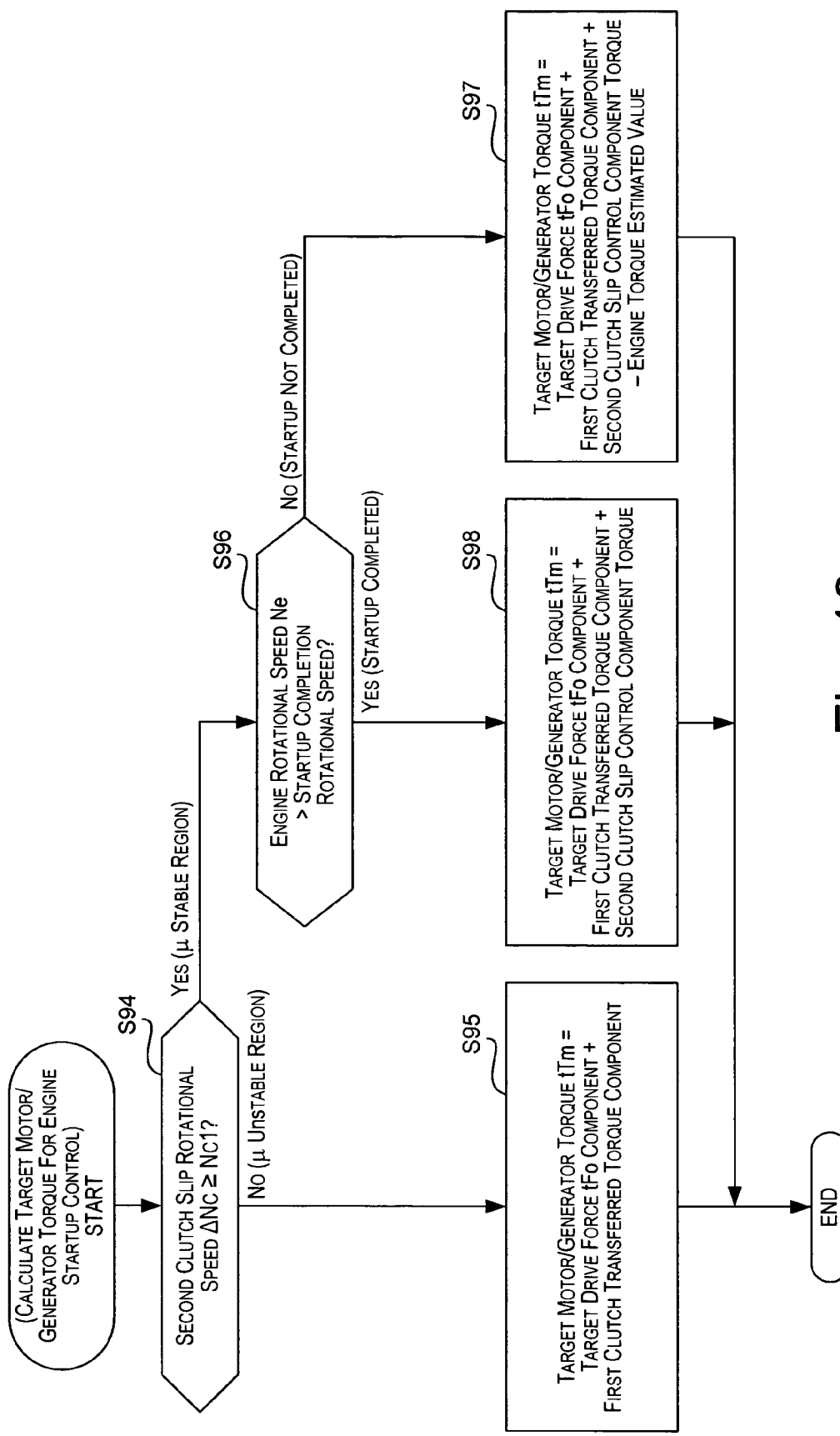
FIG. 13 is a flowchart showing a subroutine of the control process illustrated in FIG. 11 for calculating the target motor/generator torque for engine startup control in accordance with the illustrated embodiment of the present invention.

The target motor/generator torque tTm for engine startup control is determined as shown in the flowchart of FIG. 13. First, in step S94 of FIG. 13, the integrated controller 20 is configured to determine whether the coefficient of friction μ is in the stable region or the unstable region by determining whether the slip rotational speed ΔNc of the second clutch 7 is greater than or equal to the prescribed slip rotational speed ΔNc1.

If it is determined in step S94 that the coefficient of friction μ is in the unstable region where ΔNc<ΔNc1 (No in step S94), then, in step S95, the integrated controller 20 is configured to perform feedforward control of the target motor/generator torque tTm so that the target motor/generator torque tTm reaches the sum of the drive force tFo component and the first clutch transferred torque component.

The integrated controller 20 is configured to issue a command in step S9 of FIG. 5 to the motor/generator controller 22, as shown in FIG. 4, with a command value of the target motor/generator torque tTm, which was derived as described above with reference to FIG. 13.

If feedback control of the slip rotational speed of the second clutch 7 is performed by controlling the motor/generator torque in such an unstable coefficient of friction region, then the change in the clutch coefficient of friction (torque capacity) is larger than the change in the slip rotational speed during feedback control, and there is a concern that the drive force will deviate from the target value tFo, or that a shock will be produced. However, in the present embodiment, these problems can be avoided by not performing feedback control of the slip rotation of the second clutch 7 by controlling the motor/generator torque in the unstable coefficient of friction region.

Furthermore, by setting the target motor/generator torque tTm to the sum of the drive force tFo component and the first clutch transferred torque component, it is possible to reliably attain the target drive force tFo, and to crank the engine 1 as prescribed by advancing the engagement of the first clutch 6.

If it is determined in step S94 in FIG. 13 that the coefficient of friction μ is in the stable region where ΔNc≧ΔNc1, then, in step S96, the integrated controller 20 is configured to determine whether the startup of the engine 1 has been completed or not by determining whether the engine rotational speed Ne is greater than or equal to the startup completion rotational speed.

If the startup of the engine 1 has not been completed (No in step S97), then, in step S97, the integrated controller 20 is configured to set the target motor/generator torque tTm to the sum of the drive force tFo component, the first clutch transferred torque component, and the second clutch slip control component of the torque, minus an engine torque estimated value. Then, the integrated controller 20 is configured to issue a command in step S9 of FIG. 5 to the motor/generator controller 22, as shown in FIG. 4, with a command value of this target motor/generator torque tTm.

Consequently, feedback control of the slip rotational speed of the second clutch 7 is performed so as to maintain the target value by controlling the motor/generator torque, and it is possible to prevent a scenario wherein an excessive engine torque component is transmitted to the drive wheels 2, making the drive force exceed the target drive force tFo.

In this embodiment of the present invention, the slip rotational speed target value of the second clutch 7 is set to a value greater than or equal to the prescribed value ΔNc1. However, it is possible to set a lower limit value needed to ensure that the fluctuations in the drive force to the drive wheels 2 falls within a permissible range, thereby mitigating, for example, torque fluctuations during engine startup, or the transmission of the first clutch 6 engagement shock to the wheels 2.

Furthermore, in the present embodiment, the slip rotational speed of the second clutch 7 needed to maintain the target value was attained by controlling the motor/generator torque. However, it is apparent from the disclosure of the present invention that the target slip rotational speed may be maintained by controlling the torque transfer capacity of the second clutch 7 instead.

If it is determined in step S96 that engine startup has completed (Yes in step S96), then, in step S98, the integrated controller 20 is configured to set the target motor/generator torque tTm to the sum of the drive force tFo component, the first clutch transferred torque component, and the second clutch slip control component of the torque. Then, the integrated controller 20 is configured to issue a command in step S9 of FIG. 5 to the motor/generator controller 22, as shown in FIG. 4, with a command value of this target motor/generator torque tTm.

Referring back to FIG. 11, if it is determined in step S81 that the target drive mode is the EV mode (No in step S81), and in step S83 that the current drive mode is the HEV mode (Yes in step S83), i.e., that the drive mode is to be switched from the HEV mode to the EV mode, then, in step S86, the integrated controller 20 is configured to set the target torque tTm of the motor/generator 5 to the target value for use when transitioning to the EV mode. Then, the integrated controller 20 is configured to issue a command in step S9 of FIG. 5 to the motor/generator controller 22, as shown in FIG. 4, with a command value of this target motor/generator torque tTm.

If it is determined in step S81 that the target drive mode is the EV mode (No in step S81), and in step S83 that the current drive mode is the EV mode (No in step S83), i.e., that the EV mode is to be maintained, then, in step S87, the integrated controller 20 is configured to set the target motor/generator torque tTm to the target value for the EV mode.

Figure 14:
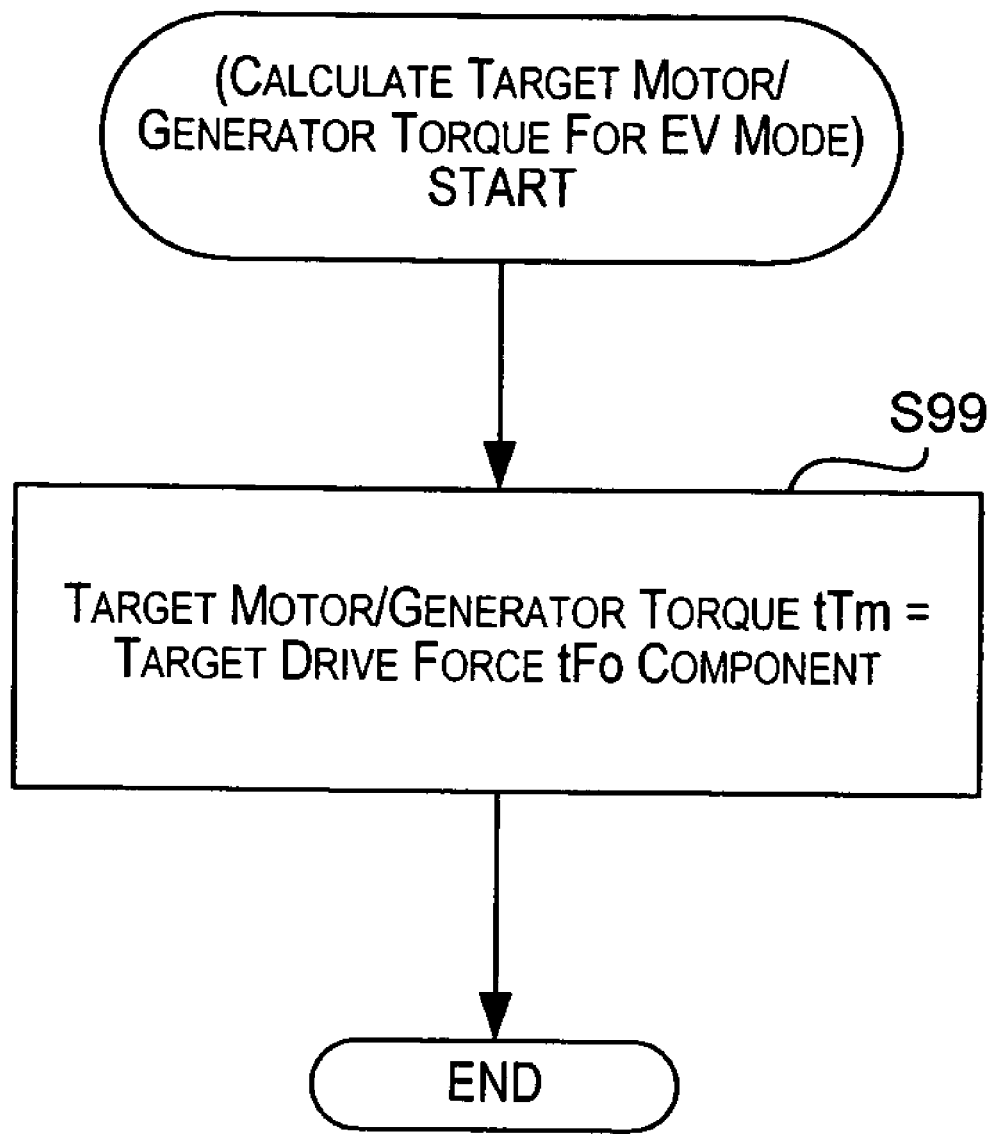
FIG. 14 is a flowchart showing a subroutine of the control process illustrated in FIG. 11 for calculating the target motor/generator torque for the EV mode.

Such a target motor/generator torque tTm for the EV mode is determined by executing the subroutine shown in the flowchart of FIG. 14.

More specifically, in step S99, the integrated controller 20 is configured to set the target motor/generator torque tTm to a value that corresponds to the drive force tFo. Then, the integrated controller 20 is configured to issue a command in step S9 of FIG. 5 to the motor/generator controller 22, as shown in FIG. 4, with a command value of this target motor/generator torque tTm.

Figure 15:
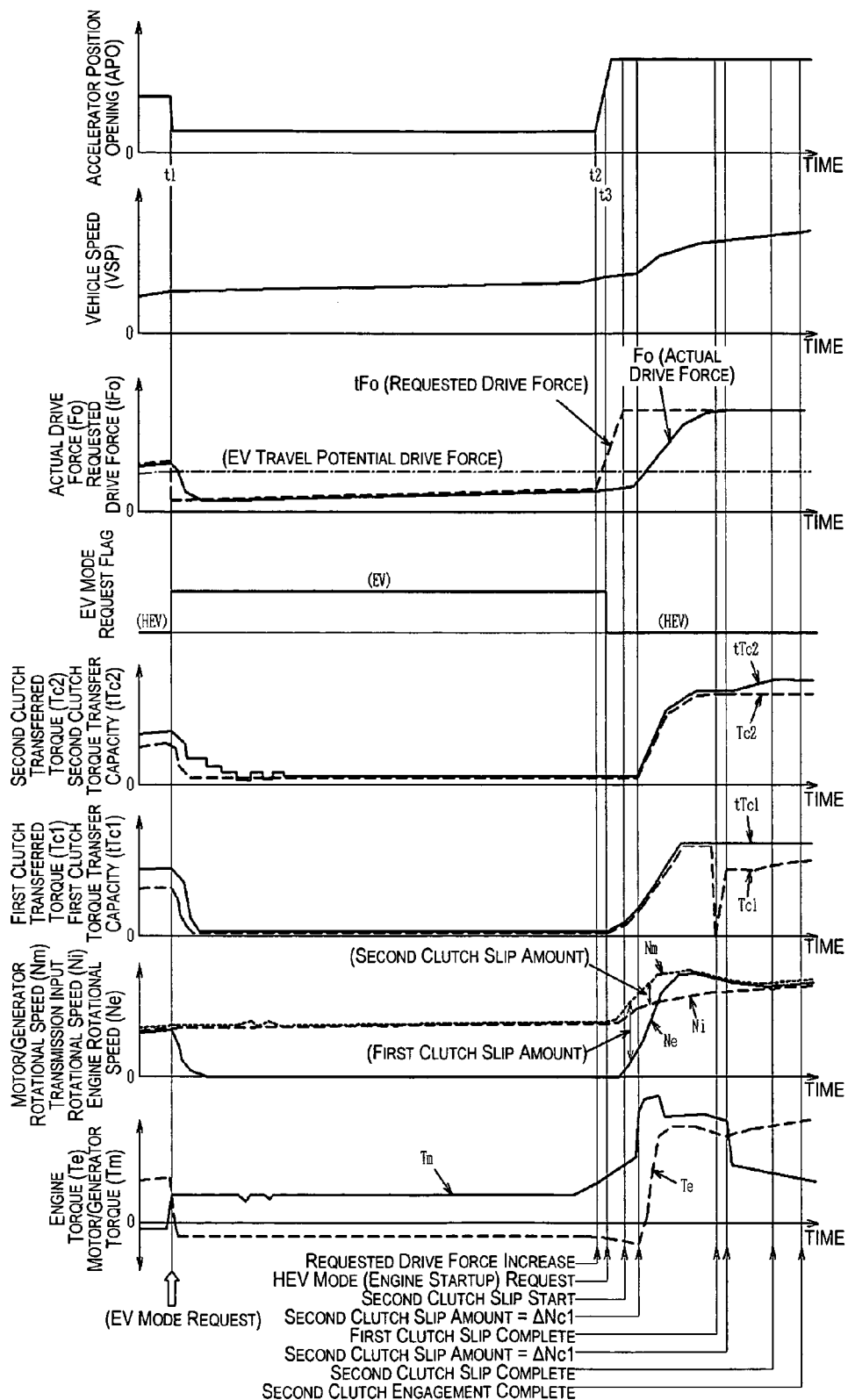
FIG. 15 is an operation time chart illustrating the operational effects of the control program shown in FIG. 5.

Referring now to an operation time chart shown in FIG. 15, the operational effect of controlling the target second clutch torque transfer capacity tTc2 according to the abovementioned embodiment will now be explained in a case the acceleration position opening APO during travel in the HEV mode decreases at time t1 and once again increases at time t2, and the vehicle speed VSP changes attendant with changes in the requested drive force tFo (the actual drive force is indicated by Fo), a request is generated at time t1 to switch from the HEV mode to the EV mode, and a request is generated at time t3 to switch from the EV mode to the HEV mode.

When the vehicle is traveling in the HEV mode, which uses the drive power from the motor/generator 5 as at least part of the vehicle drive force; the target torque transfer capacity tTc2 of the second clutch 7 for the motor/generator torque share is determined in step S14 of FIG. 6 (refer to the flowchart of FIG. 7 for details) separately from the torque transfer capacity of the second clutch 7 for the engines torque share, based on the target motor/generator torque tTm and the motor/generator safety factor (e.g., 1.0).

When switching from the HEV mode to the EV mode, the target torque transfer capacity tTc2 of the second clutch 7 for the motor/generator torque share is determined in step S18 of FIG. 6 (refer to the flowchart of FIG. 9 for details) separately from the torque transfer capacity of the second clutch 7 for the engine torque share, based on the target motor/generator torque tTm and the motor/generator safety factor (e.g., 1.0).

When switching from the EV mode to the HEV mode, the target torque transfer capacity tTc2 of the second clutch 7 for the motor/generator torque share is determined in step S16 of FIG. 6 (refer to FIG. 8 for details) separately from the torque transfer capacity of the second clutch 7 for the engine torque share, based on the target motor/generator torque tTm and the motor/generator safety factor (e.g., 1.0).

Consequently, with the present invention, an appropriate safety factor is used when determining the motor/generator torque share of the target torque transfer capacity tTc2 of the second clutch 7. Thus, the target torque transfer capacity tTc2 of the second clutch 7 does not become excessively large, and it is thereby possible to avoid problems related to degradation in fuel economy and a reduction of drive power performance caused by the torque transfer capacity of the second clutch 7 becoming excessively large.

Furthermore, in the EV mode, wherein the vehicle travels by the drive power from the motor/generator 5 only, the target torque transfer capacity tTc2 of the second clutch 7 is determined as follows in step S19 of FIG. 6 (refer to FIG. 10 for details). More specifically, the target second clutch torque transfer capacity tTc2 for the EV mode is determined by learning control, wherein the slippage of the second clutch 7 is detected, the target torque transfer capacity tTc2 of the second clutch 7 is decreased until slippage is detected, and the target torque transfer capacity tTc2 of the second clutch 7 is increased when slippage is detected. consequently, it is possible to determine critical values for the target second clutch torque transfer capacity tTc2 at which the second clutch 7 slips or does not slip, and to limit the target torque transfer capacity tTc2 of the second clutch 7 from becoming excessive, which makes it possible to more reliably achieve the operational effect of avoiding problems related to degradation in fuel economy and a reduction of drive power performance.

In addition, in the present embodiment, the motor/generator safety factor is set to, for example, 1.0, which is lower than the safety factor (1.3) used when determining the torque transfer capacity of the second clutch 7 for the engine torque share. The engine torque includes, for example, a static indefinite component and a pulsating component, and has dynamic characteristics. In contrast, compared with the engine 1, the motor/generator 5 has torque with a small static indefinite component and a small pulsating component, and exhibits highly responsive control. Therefore, by using a smaller value of the safety factor for the motor/generator torque share of the target torque transfer capacity tTc2, it is possible to achieve remarkable operational effects.

Figure 7:
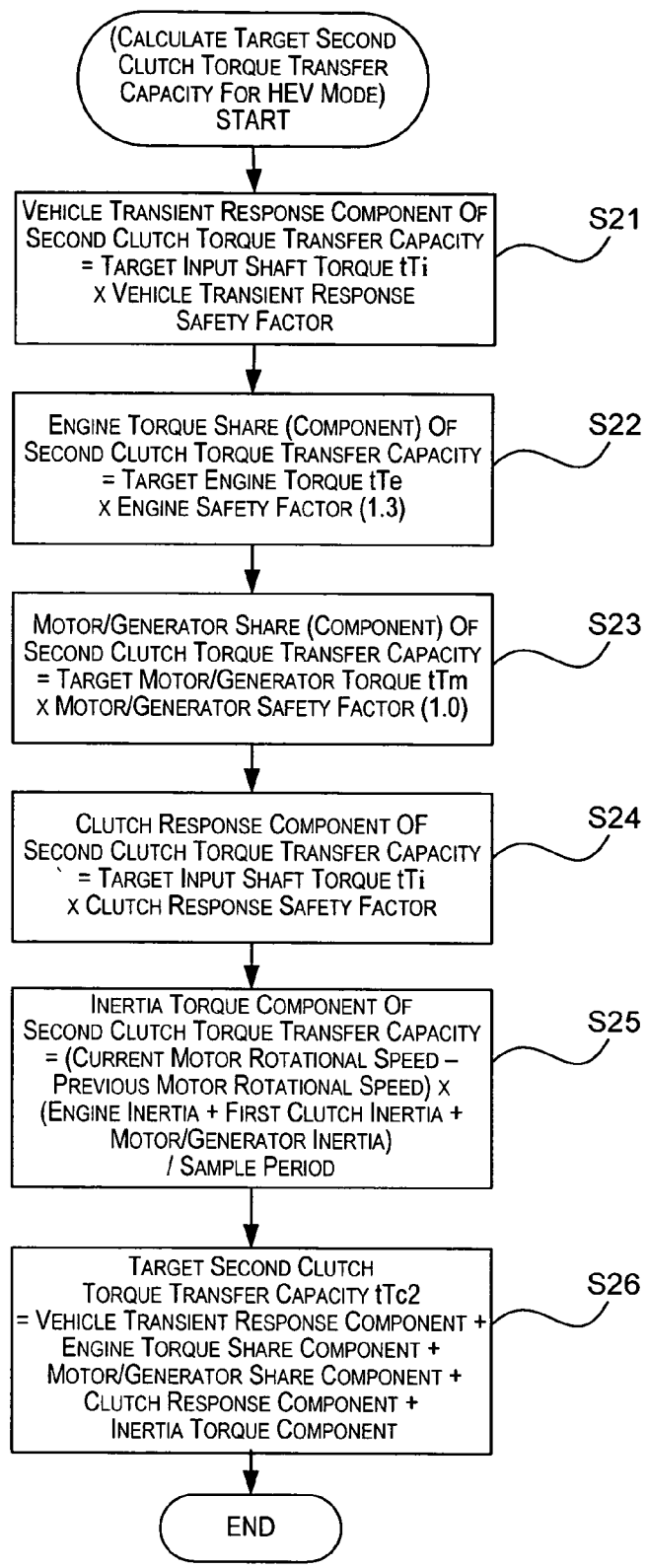
FIG. 7 is a flowchart showing a subroutine of the control process illustrated in FIG. 6 for calculating the target second clutch torque transfer capacity for the HEV mode in accordance with the illustrated embodiment of the present invention.

Furthermore, when calculating the target torque transfer capacity tTc2 of the second clutch 7, the calculation is performed using the motor/generator torque, which is corrected by the amount of the rotational inertia portion attendant with rotational changes in the motor/generator 5, as in step S25 in FIG. 7. Consequently, it is possible to eliminate adverse effects, which are caused by the rotational inertia portion attendant with changes in the rotation of the motor/generator 5, from the target second clutch torque transfer capacity tTc2, and thereby to make the target second clutch torque transfer capacity tTc2 more accurate, which makes it possible to achieve even more remarkable operational effects.

Furthermore, when calculating the target torque transfer capacity tTc2 of the second clutch 7, it is possible to perform the calculation using a motor/generator torque that has been reduced by the amount of the torque component consumed by the frictional force that induces changes in the torque from the motor/generator 5 to the drive wheels 2. In other words, it is also possible to perform the calculation using a motor/generator torque that has been reduced by the amount of the torque component consumed in the drive of one or more auxiliary devices 17 (only one shown in FIGS. 1 to 3) that induces changes in the torque from the motor/generator 5 to the drive wheels 2. For example, the auxiliary devices 17 include, but not limited to, a power steering pump, an air conditioner compressor or the like. When the vehicle is in the hybrid drive mode, the engine drives the auxiliary devices 17. Likewise, if the vehicle is in the electric drive mode, the vehicle needs the motor/generator 5 to drive the auxiliary device 17 (e.g., the power steering pump, the air conditioner compressor or the like). Thus, with this arrangement in the electric drive mode, the motor/generator's power is calculated based on the demanded drive force and the drive force of the auxiliary device(s) 17 (e.g., the power steering pump drive force and the air conditioner compressor drive force, etc.). Accordingly, in this invention, the target torque transfer capacity tTc2 of the second clutch 7 is calculated based on demanded drive force because the part of the motor/generators drive force is consumed by power steering pump and air conditioner compressor etc. In this case, it is possible to eliminate adverse effects, caused by, for example, the above-mentioned frictional force or the auxiliary device drive force, from the target second clutch torque transfer capacity tTc2, which can therefore be made even more accurate, making it possible to achieve even more remarkable operational effects. Thus, when an auxiliary device(s) is present, the integrated controller 20 is further configured to calculate the motor/generator torque component of the target second torque transfer capacity tTc2 of the second clutch 7 using the motor/generator torque that is reduced by an amount of torque used to drive the auxiliary device which causes a change in an amount of torque transferred from the motor/generator to the drive wheels 2.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hybrid vehicle control system comprising:
    an engine;
    a motor/generator;
    a first clutch configured and arranged to change a first torque transfer capacity between the engine and the motor/generator;
    a second clutch configured and arranged to change a second torque transfer capacity between the motor/generator and at least one drive wheel by selectively maintaining a target torque transfer capacity calculated based on a target drive force when the second clutch is transferring power from at least the motor/generator to the drive wheel; and
    a controller configured to selectively control the first and second clutches to switch between an electric drive mode in which the first clutch is released and the second clutch is engaged, and a hybrid drive mode in which both the first and second clutches are engaged,
    the controller being configured to determine and set the target torque transfer capacity of the second torque transfer capacity including a motor/generator torque component and an engine torque component with the motor/generator torque component being determined based on a motor/generator torque and a torque transfer capacity margin allowance for the motor/generator torque and the engine torque component being determined based on an engine torque and a torque transfer capacity margin allowance for the engine torque when the drive wheel is driven at least by the motor/generator.

2. The hybrid vehicle control system as recited in claim 1, wherein
    the controller is further configured to set the torque transfer capacity margin allowance for the engine torque larger than the torque transfer capacity margin allowance for the motor/generator torque.

3. The hybrid vehicle control system as recited in claim 1, wherein
    the controller is further configured to set the torque transfer capacity margin allowance for the motor/generator torque to zero.

4. The hybrid vehicle control system as recited in claim 1, wherein
    the controller is further configured to adjust the second torque transfer capacity based on a rotational inertia force relating to a change in rotation of the motor/generator.

5. The hybrid vehicle control system as recited in claim 1, wherein
    the controller is further configured to calculate the motor/generator torque component of the second torque transfer capacity using the motor/generator torque that is reduced by an amount of torque used to drive an auxiliary device which causes a change in an amount of torque transferred from the motor/generator to the drive wheel.

6. The hybrid vehicle control system as recited in claim 1, wherein
    the controller is further configured to calculate the motor/generator torque component of the second torque transfer capacity using the motor/generator torque that is reduced by an amount of torque consumed by a friction that induces a change in an amount of torque transferred from the motor/generator to the drive wheel.

7. The hybrid vehicle control system as recited in claim 1, wherein
    the controller is further configured to determine the second torque transfer capacity used in the electric drive mode by a learning control configure to
    detect a slipping state of the second clutch,
    reduce the second torque transfer capacity until detecting the slipping state of the second clutch, and
    increase the second torque transfer capacity upon detecting the slipping state of the second clutch.

8. The hybrid vehicle control system as recited in claim 1, wherein an engine;
- a motor/generator; a first clutch configured and arranged to change a first torque transfer capacity between the engine and the motor/generator;
- a second clutch configured and arranged to change a second torque transfer capacity between the motor/generator and at least one drive wheel; and
- a controller configured to selectively control the first and second clutches to switch between an electric drive mode in which the first clutch is released and the second clutch is engaged, and a hybrid drive mode in which both the first and second clutches are engaged,
- the controller being configured to determine the second torque transfer capacity including a motor/generator torque component and an engine torque component with the motor/generator torque component being determined based on a motor/generator torque and a torque transfer capacity margin allowance for the motor/generator torque and the engine torque component being determined based on an engine torque and a torque transfer capacity margin allowance for the engine torque when the drive wheel is driven at least by the motor/generator,
- the controller being further configured to use a safety factor for the motor/generator as the torque transfer capacity margin allowance for the motor/generator torque and to use a safety factor for the engine as the torque transfer capacity margin allowance for the engine torque.

9. The hybrid vehicle control system as recited in claim 8, wherein
- the controller is further configured to set the safety factor for the motor/generator to a value that is smaller than the safety factor for the engine.

10. The hybrid vehicle control system as recited in claim 8, wherein
- the controller is further configured to set the safety factor for the motor/generator to 1.0.

11. The hybrid vehicle control system as recited in claim 8, wherein
- the controller is further configured to adjust the second torque transfer capacity based on a rotational inertia force relating to a change in rotation of the motor/generator.

12. The hybrid vehicle control system as recited in claim 8, wherein
- the controller is further configured to calculate the motor/generator torque component of the second torque transfer capacity using the motor/generator torque that is reduced by an amount of torque used to drive an auxiliary component which causes a change in an amount of torque transferred from the motor/generator to the drive wheel.

13. The hybrid vehicle control system as recited in claim 8, wherein
- the controller is further configured to calculate the motor/generator torque component of the second torque transfer capacity using the motor/generator torque that is reduced by an amount of torque consumed by a friction that induces a change in an amount of torque transferred from the motor/generator to the drive wheel.

14. The hybrid vehicle control system as recited in claim 8, wherein
- the controller is further configured to determine the second torque transfer capacity used in the electric drive mode by a learning control configure to
  - detect a slipping state of the second clutch,
  - reduce the second torque transfer capacity until detecting the slipping state of the second clutch, and
  - increase the second torque transfer capacity upon detecting the slipping state of the second clutch.

15. A hybrid vehicle control system comprising:
- first power supply means for supplying a first source of power;
- second power supply means for supplying a second source of power;
- first power transfer means for selectively changing a first torque transfer capacity between the first and second power supply means;
- second power transfer means for selectively changing a second torque transfer capacity between the second power supply means and at least one drive wheel of a hybrid vehicle by selectively maintaining a target torque transfer capacity calculated based on a target drive force when the second power transfer means is transferring power from at least the second power supply means to the drive wheel; and
- control means for selectively controlling the first and second power transfer means to switch between an electric drive mode by releasing the first power transfer means and engaging the second power transfer means, and a hybrid drive mode by engaging both the first and second power transfer means,
- the control means further including a function for determining and setting the target torque transfer capacity of the second torque transfer capacity including a second source of power component and a first source of power component with the second source of power component being determined based on a torque from the second power supply means and a torque transfer capacity margin allowance for the second power supply means and the first source of power component being determined based on a torque from the first power supply means and a torque transfer capacity margin allowance for the first power supply means when the drive wheel is driven at least by the second power supply means.

16. A hybrid vehicle control method comprising:
- selectively changing a first torque transfer capacity between an engine and the motor/generator using a first clutch;
- selectively changing a second torque transfer capacity between the motor/generator and at least one drive wheel of a hybrid vehicle using a second clutch by selectively maintaining a target torque transfer capacity calculated based on a target drive force when the second clutch is transferrring power from at least the motor/generator to the drive wheel;
- selectively controlling the first and second clutches to switch between an electric drive mode by releasing the first clutch and engaging the second clutch, and a hybrid drive mode by engaging both the first and second clutches; and
- determining and setting the target torque transfer capacity of the second torque transfer capacity including a motor/generator torque component and an engine torque component with the motor/generator torque component being determined based on a motor/generator torque and a torque transfer capacity margin allowance for the motor/generator torque and the engine torque component being determined based on an engine torque and a torque transfer capacity margin allowance for the engine torque when the drive wheel is driven at least by the motor/generator.

* * * * *